United States Patent [19]
Suzuki et al.

[11] Patent Number: 5,528,279
[45] Date of Patent: Jun. 18, 1996

[54] SINGLE ELEMENT BEAM SCANNING APPARATUS HAVING ENTRANCE AND EXIT FACES AND A REFLECTING FACE THEREBETWEEN

[75] Inventors: Takashi Suzuki; Yujirou Nomura; Nozomu Inoue; Kyu Takada, all of Nagano, Japan

[73] Assignee: Seiko Epson Corporation, Tokyo, Japan

[21] Appl. No.: 79,827

[22] Filed: Jun. 23, 1993

[30] Foreign Application Priority Data

Jun. 24, 1992 [JP] Japan .................................. 4-166042
Apr. 26, 1993 [JP] Japan .................................. 5-121995

[51] Int. Cl.⁶ ........................................................ B41J 15/16
[52] U.S. Cl. ........................................... 347/260; 359/215
[58] Field of Search ............................ 346/108, 107 L, 346/76 L, 160, 1.1; 347/256, 260, 259, 243, 241, 134; 359/192, 208, 212, 214, 215, 223

[56] References Cited

U.S. PATENT DOCUMENTS

| | | | |
|---|---|---|---|
| 3,614,194 | 10/1971 | Harris | 350/7 |
| 4,061,415 | 12/1977 | Taenzer | 350/6 |
| 4,514,050 | 4/1985 | Stites | 350/444 |
| 5,321,431 | 6/1994 | Takeno | 346/108 |

FOREIGN PATENT DOCUMENTS

| | | | |
|---|---|---|---|
| 2033213 | 12/1969 | France | G02B 27/00 |
| 1100315 | 2/1961 | Germany . | |
| 4130977 | 3/1993 | Germany | G02B 26/10 |
| 343112 | 2/1931 | United Kingdom . | |

*Primary Examiner*— Mark J. Reinhart
*Attorney, Agent, or Firm*—Sughrue, Mion, Zinn, Macpeak & Seas

[57] ABSTRACT

To enable scanning by a light beam with a single unit of rotating optics, a light beam issuing from semiconductor laser 1 is launched into rotating lens mirror 3 through entrance face $S_1$, thence directed to reflecting face $S_2$, whereby it is deflected to leave the lens mirror 3 through exit face $S_3$ and form a spot that scans over the imaging plane.

17 Claims, 21 Drawing Sheets

ω=14.7°

----- MAIN SCAN
——— SUB SCAN

CURVATURE OF FIELD mm

ω=14.7°

SCANNING LINEARITY %

ω=20.3°

---- MAIN SCAN
—— SUB SCAN

CURVATURE OF FIELD  mm

ω=20.3°

SCANNING LINEARITY %

ω=18.0°

----- MAIN SCAN
——— SUB SCAN

-2.0    2.0
CURVATURE OF FIELD  mm

ω=18.0°

-1.0    1.0
SCANNING LINEARITY %

ω=21.2°

---- MAIN SCAN
—— SUB SCAN

-5.0   5.0
CURVATURE OF FIELD  mm

ω=21.2°

-1.0   1.0
SCANNING LINEARITY %

ω=21.0°

---- MAIN SCAN
—— SUB SCAN

-2.0    2.0
CURVATURE OF FIELD  mm

ω=21.0°

-1.0    1.0
SCANNING LINEARITY %

ω=20.6°

CURVATURE OF FIELD  mm

ω=20.6°

SCANNING LINEARITY %

ω=21.0°

----- MAIN SCAN
——— SUB SCAN

CURVATURE OF FIELD mm

ω=21.0°

SCANNING LINEARITY %

ω=20.6°

CURVATURE OF FIELD  mm

----- MAIN SCAN
——— SUB SCAN

ω=20.6°

SCANNING LINEARITY %

ω=19.7°

CURVATURE OF FIELD  mm

----- MAIN SCAN
——— SUB SCAN

ω=19.7°

SCANNING LINEARITY %

ω=20.7°

---- MAIN SCAN
—— SUB SCAN

CURVATURE OF FIELD  mm

ω=20.7°

SCANNING LINEARITY %

ω=20.0°

CURVATURE OF FIELD mm

ω=20.0°

SCANNING LINEARITY %

ω=27.0°

---- MAIN SCAN
—— SUB SCAN

-2.0    2.0
CURVATURE OF FIELD  mm

ω=27.0°

-1.0    1.0
SCANNING LINEARITY %

ω=20.1°

----- MAIN SCAN
——— SUB SCAN

CURVATURE OF FIELD  mm

ω=20.1°

SCANNING LINEARITY %

ω=17.0°

---- MAIN SCAN
—— SUB SCAN

CURVATURE OF FIELD  mm

ω=17.0°

SCANNING LINEARITY %

ω=22.7°

----- MAIN SCAN
——— SUB SCAN

-10.0      10.0
CURVATURE OF FIELD  mm

ω=22.7°

-1.0       1.0
SCANNING LINEARITY %

5,528,279

SINGLE ELEMENT BEAM SCANNING APPARATUS HAVING ENTRANCE AND EXIT FACES AND A REFLECTING FACE THEREBETWEEN

BACKGROUND OF THE INVENTION

1. Field of the Invention

The present invention relates to a beam scanning apparatus for use with laser beam printers or the like.

2. Description of the Related Art

A beam scanning apparatus for use with laser beam printers or the like are adapted in such a way that a light beam issuing from a light source such as a semiconductor laser is collimated with a collimator lens, then deflected for scanning with a rotating polygonal mirror and passed through an imaging lens to form a focused beam spot on an imaging plane.

Besides the need to use the expensive imaging lens and polygonal mirror, the conventional beam scanning apparatus suffers from the problem that the diameter of the imaging lens is as large as about 100 mm and that the size of the polygonal mirror is about 20 mm in terms of the radius of the inscribed circle. Thus, the conventional beam scanning apparatus is unavoidably bulky in size.

SUMMARY OF THE INVENTION

The present invention has been accomplished under these circumstances and has as an object providing a novel beam scanning apparatus that satisfies both the requirements for smaller size and lower cost.

The present invention attains the above-described and other objects by a beam scanning apparatus in which a reflecting face, as well as an entrance face and an exit face at least one of which is so specified for shape as to be capable of correcting aberrations are provided for an optical element that is driven by a rotational drive means to rotate and deflects a beam from a beam generator.

In the beam scanning apparatus of the present invention which is designed in the manner described above, the single optical element is rotated as a beam incident on the entrance face is deflected by the reflecting face to leave the rotating element through the exit face while, at the same time, the necessary aberrational corrections are made to insure that the beam scanning over the imaging plane will be focused as a spot.

DESCRIPTION OF THE PREFERRED EMBODIMENTS

Figure 1:
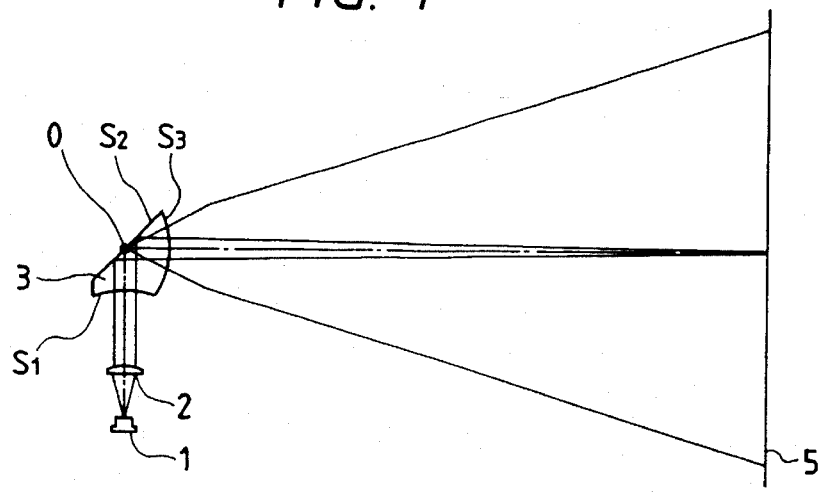
FIG. 1 is a diagram showing schematically the composition of a beam scanning apparatus according to a typical example of the present invention.
Figure 2:
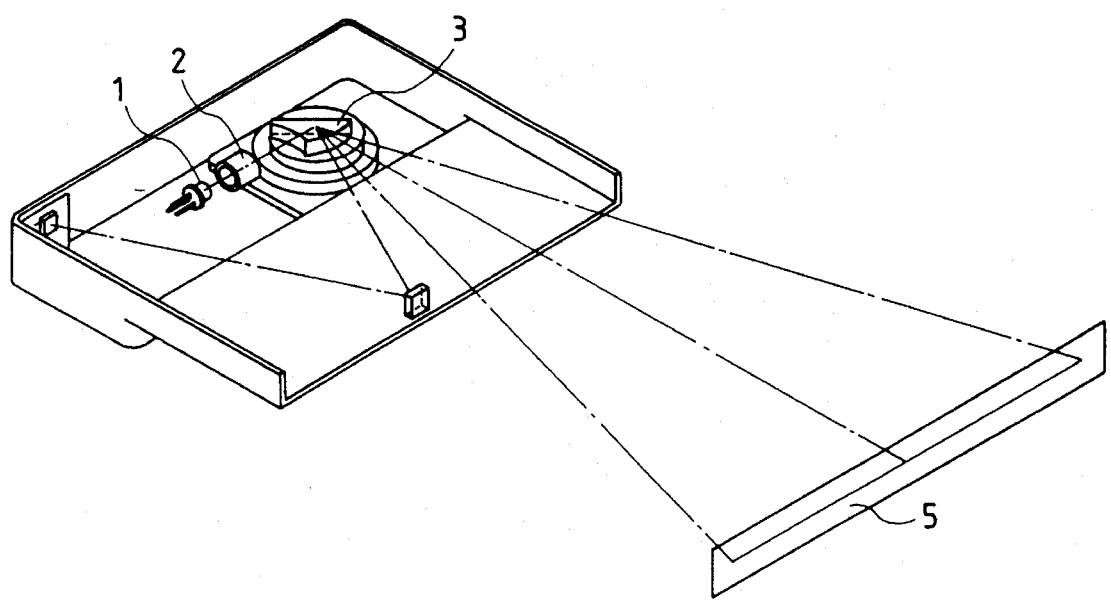
FIG. 2 is a perspective view of the same apparatus.

FIGS. 1 to 4 show a typical example of the beam scanning apparatus of the present invention.

A light beam issuing from a semiconductor laser 1 is collimated by a collimator lens 2; the beam then falls on the entrance face $S_1$ of a rotating lens mirror 3 as an optical element and is reflected by the reflecting face $S_2$ of the mirror 3 so that it will emerge from the lens mirror 3 through the exit face $S_3$.

In the example under consideration, the entrance face $S_1$ and the exit face $S_3$ are a concave and convex, respectively; the two faces are set so that a light beam scanning at the scan center will pass through those faces perpendicularly. The reflecting face $S_2$ is set so that the light beam scanning at the scan center will be incident on that face at an angle of 45°.

The rotating lens mirror 3 is adapted in such a way that the rotating axis 0 is included in the reflecting face $S_2$ and will pass through the point of reflecting of the light beam scanning at the scan center. In the example under consideration, the rotating lens mirror 3 is so adapted that the optical axes of the entrance face $S_1$ and the exit face $S_3$ will coincide with the optical path of the light beam scanning at the scan center. Therefore, the light beam is deflected as the lens mirror 3 is rotated and the deflected light beam will form a spot on the plane 5 as it is scanned. There is no particular need to use an imaging lens or the like in the example under consideration but, if desired, an imaging lens may be provided between the lens mirror 3 and the scanning plane 5; in this way, the optical characteristics of the system are further enhanced and the greater the number of imaging lenses used, the better are the optical characteristics that can be attained.

Figure 3:
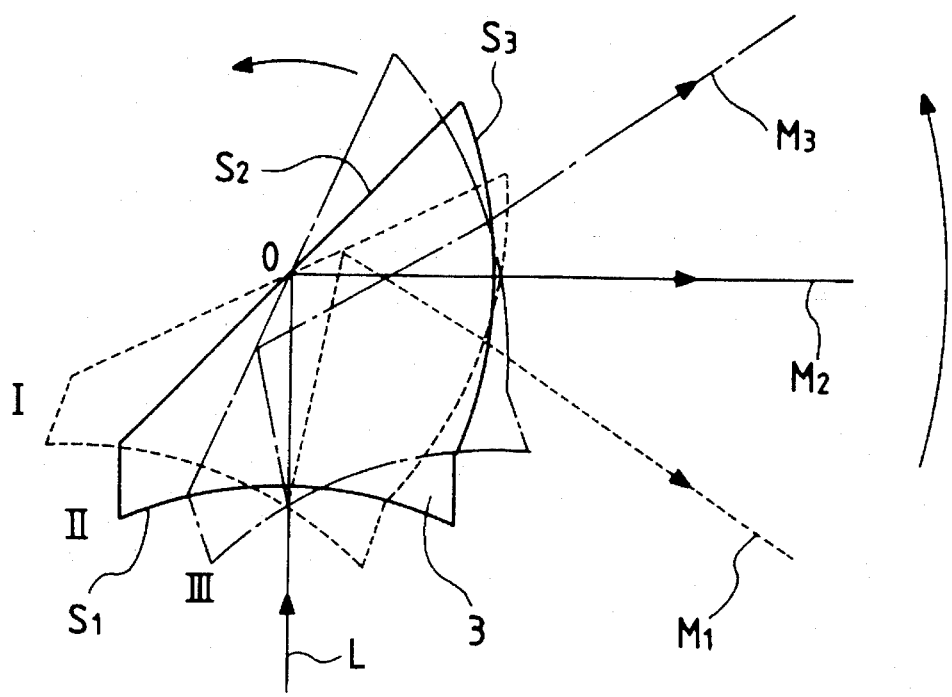
FIG. 3 shows how a light beam is deflected as a function the rotation of a lens mirror.

FIG. 3 depicts how the light beam is deflected as a function of the rotation of the lens mirror 3. The lens mirror 3 basically rotates about the rotating center 0 in the reflecting face $S_2$ to be displaced in position as indicated by I, II and III. As the lens mirror 3 is rotated, the incident light beam L will fall on the entrance face $S_1$ in different positions at different angles of incidence; hence, the beam L is deflected under the action of different refractive powers. The incident beam is then reflected by the reflecting face $S_2$ and deflected at a greater angle. When passing through the exit face $S_3$, the beam is subjected to different refractive powers depending upon the position of the rotating lens mirror 3 and it is eventually deflected to produce an emerging beam $M_1$, $M_2$ or $M_3$. It should also be noted that since the entrance face $S_1$ and the exit face $S_3$ are curved, the light beam is subjected to either a diverging or a converging action.

In the example under consideration, the entrance face $S_1$ of the lens mirror 3 is rendered concave whereas the exit face $S_3$ is rendered convex and because of this design, the lens mirror 3 proves to be very effective in correcting aberrations. As a result, there is no particular need to provide an imaging lens between the lens mirror 3 and the scanning plane 5; even if an imaging lens is provided at all, a small-diameter and low-index lens will suffice, thereby making it possible to realize a very compact and inexpensive apparatus.

In the case of optics to be generally used in laser beam printers or the like, the laser beam to be produced has a small diameter, so among the various aberrations that develop in the optics, one only need consider the following three as principal types: curvature of the field, astigmatism and distortion characteristics. Distortion is worth special mention since a negative distortion characteristic which is generally called "an fθ characteristic" is provided and this is due to the fact that the uniform angular velocity motion of the rotating polygonal mirror must be transformed to the uniform velocity motion of an imaging spot on the scanning plane.

Figure 4:
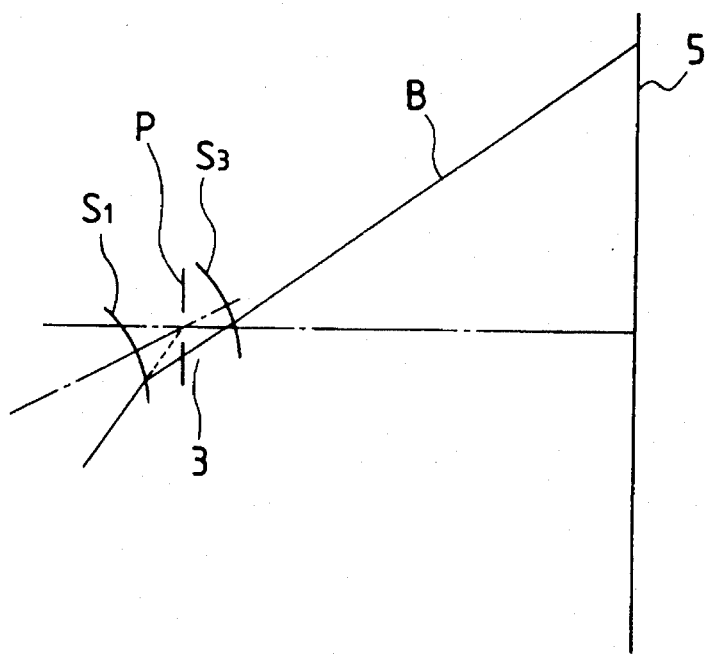
FIG. 4 is a diagram of the lens mirror as it is developed with respect to the reflecting face.

FIG. 4 shows a cross section of the optics in the example under consideration as it is taken in the main scanning direction and developed with respect to the reflecting face $S_2$ of the lens mirror 3. As one can see from this drawing, the optics in the example under consideration differs form the one used in the conventional beam scanning apparatus in that an optical surface (entrance face $S_1$ of the lens mirror 3) is located in front of the entrance pupil P and this is equivalent to the case where the lens mirror 3 rotates through one half the incident angle of the light beam B. Speaking of the elimination of various aberrations, the entrance face $S_1$ of the lens mirror 3 is located in front of the entrance pupil P and, hence, by making the entrance face $S_1$ concave so that it will have a negative power, said face is allowed to serve two important purposes at the same time, i.e., producing a negative distortion and reducing the Petzval sum. Furthermore, the entrance face $S_1$ and exit face $S_3$ of the lens mirror 3 are rotated in the same directing through one half the incident angle of the light beam B; hence, the incident light beam will eventually cover only one half the view angle and the resulting decrease in the effective aperture helps reduce the size of the lens mirror 3 by a significant degree.

Figure 5A:
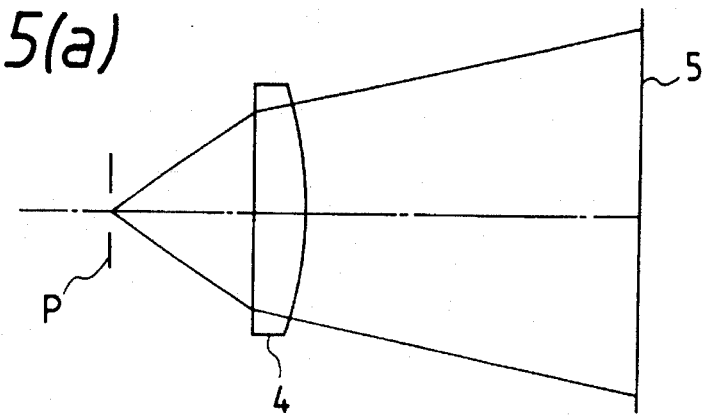
FIG. 5(a) shows the size of an imaging lens used in the prior art beam scanning apparatus.

If desired, an imaging lens may be used as an auxiliary means and, in this case, an imaging lens of a smaller diameter can be used with the conventional beam scanning apparatus. This may be better understood by referring to FIG. 5. With the conventional beam scanning apparatus shown in FIG. 5(a), an imaging lens 4 having a positive power must be kept by a sufficient distance from the entrance pupil P to produce a negative distortion and this has unavoidably increased the aperture of the imaging lens 4; furthermore, high refractive index rather than low index has been a general requirement for the purpose of creating an adequately negative distortion.

Figure 5B:
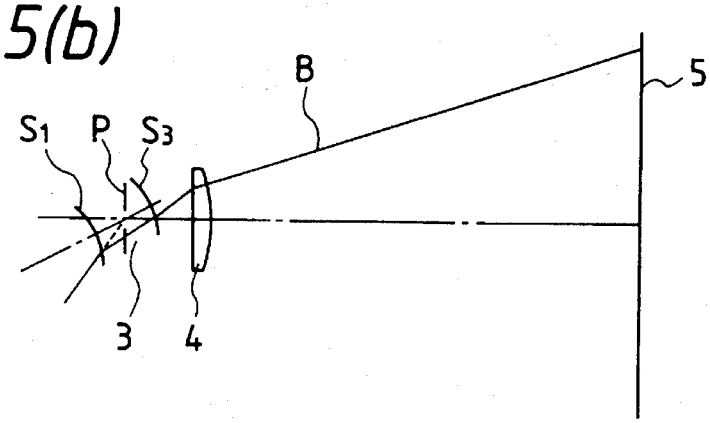
FIG. 5(b) shows the size of an imaging lens used in the beam scanning apparatus of the present invention.

In contrast, the system of the present invention which is shown in FIG. 5(b) allows both the lens mirror 3 and the imaging lens 4 to be responsible for the creation of a negative distortion; hence, the imaging lens 4 per se needs to develop only a small quantity of negative distortion, thereby permitting the imaging lens 4 to come closer to the entrance pupil and, hence, contributing to the reduction in its size. It should also be mentioned that the decrease in the amount of negative distortion that is produced by the imaging lens 4 will contribute to a lower refractive index of this lens. Further, the negative distortion that is developed at the entrance face $S_1$ of the lens mirror 3 will prevent the incoming light beam from spreading excessively wide as it is launched into the imaging lens 4 and this is also effective in reducing the diameter of that lens.

A single spherical lens element will suffice as the imaging lens if it is used at all. It should also be noted that if the imaging lens system is adapted to have a positive overall refractive power, a negative distortion for insuring scanning at uniform speed will be produced, thereby providing better optical characteristics for the beam scanning apparatus.

According to another feature of the present invention, the rotating axis of the lens mirror 3 is contained in the reflecting face $S_2$. This enables the lens mirror 3 to be mounted on a rotating member such as a motor in an easy and highly precise manner since reference positions such as the center of rotation and the reflecting face are well defined. Furthermore, if the center of rotation of the lens mirror 3 coincides with the point of reflection on the reflecting face of the light beam that is scanning as the scan center, the composition of faces in the optics becomes substantially symmetric with respect to the scan center, thereby providing symmetry for aberrations and other optical characteristics. Hence, axially symmetric optics alone as typified by a spherical lens will suffice for correcting aberration characteristics and the like.

In the example under consideration, a single lens mirror 3 is used to insure that one scan is performed per rotation of the motor. It should, however, be noted that there is no need to be bound by this requirement and two lens mirrors may be used. In this case, two scans are possible per rotation of the motor, contributing to a further increase in the scan speed. If there is the slightest departure from the symmetry of either lens mirror 3, the position of the scanning line will be offset to cause uneven scanning. However, in the example under consideration, the center of rotation lies on the reflecting face $S_2$ and, hence, the above-described problem can be solved by insuring that the reflecting face $S_2$ of one lens mirror is in close contact with the reflecting face of the other lens mirror.

Figure 6A:
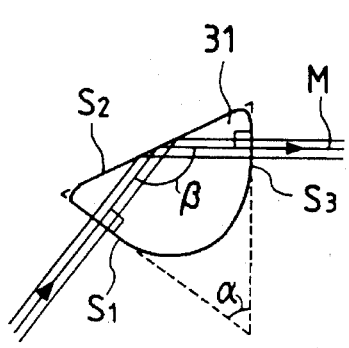
FIGS. 6(a), 6(b) an 6(c) are cross-sectional views showing three different shapes of rotating lens mirror.
Figure 7:
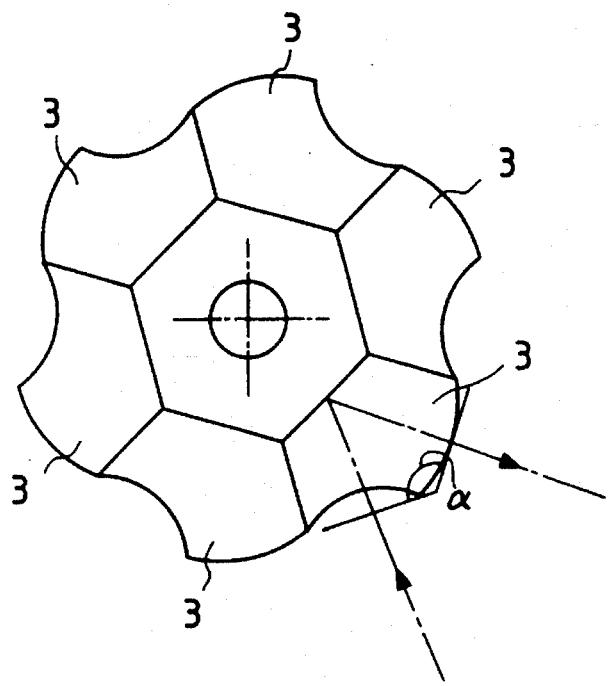
FIG. 7 depicts the arrangement of multiple lens mirrors.

FIGS. 6(a), (b) and (c) show three rotating lens mirrors 31, 32 and 33 that are adapted in such a way that the angle $\alpha$ formed between the entrance face $S_1$ and the exit face $S_3$ take on different values. The angle $\alpha$ is set in accordance with the angle $\beta$ formed between optical axis M extending to the scanning plane 5 and the light beam issuing from the light source; however, from the viewpoint of aberrational correction, both the entrance face $S_1$ and the exit face $S_3$ are desirably set in such a way that the light beam scanning at the scan center will pass through those faces perpendicularly. In this case, the wider the angle $\alpha$, the smaller the area that is required of the reflecting face $S_2$. In addition, considering the fact that lens mirrors 31, 32 and 33 are rotated at high speed, their apices are desirably made arcuate in order to reduce the whine and air loss. Furthermore, if one wants to arrange a plurality of lens mirrors 3 in symmetry of rotation, the angle $\alpha$ should preferably be made wide enough to permit the provision of a greater number of lens mirrors 3 as shown in FIG. 7.

Speaking of the constituent material of the lens mirror 3, it may be made of either optical glasses or optical plastics if neither the entrance face $S_1$ nor the exit face $S_3$ is aspheric; if these faces are aspheric, the lens mirror 3 is preferably made of optical plastics. An aluminum film or any other suitable reflecting layer may be formed on the reflecting face $S_2$ by a suitable process such as evaporation. However, one may cause total reflection at the reflecting face $S_2$ by making the angle $\beta$ large enough to insure that the angle of incidence at that face is greater than the critical value. In this case, there is no need to provide a reflecting layer on the reflecting face $S_2$.

We now describe several specific examples of the present invention together with the optical specifications of their design and the aberrations that are developed. In each example, the angle through which the lens mirror 3 rotates for the time period from the start to the end of one scan is written as $2\omega$ and the following symbols are used to denote optical specifications: ri, the radius of curvature of the Lth surface Si; and di, the on-axis distance from the ith surface to the next surface. If the surface of interest is aspheric, the aspheric coefficients in the following equation are written as Ki, Ai and Bi. In the case of a toric surface, the radii of curvature in directions parallel and perpendicular to the rotating axis of the lens mirror 3 are written as rxi and ryi, respectively:

$$zi = \frac{h^2/ri}{1 + \sqrt{1 - (Ki+1)(h/ri)^2}} + Aih^4 + bih^6$$

where zi is the distance by which the point on the aspheric surface where the height from the optical axis is h is departed from the plane tangent to the vertex of the aspheric surface, and $n_1$ and $n_2$ are both the refractive indices of the lens mirror. In those examples where the optical specifications concerning the light source, collimator lens, imaging lens and the spherical mirror are also listed, the light source, the entrance face of the collimator lens, its exit face, the entrance face of the imaging lens, its exit face and the reflecting face of the concave mirror are denoted by $S_0$, Sa, Sb, Sc, Sd and Se, respectively, whereas the refractive indices of the collimator lens and the imaging lens are denoted by $n_a$ and $n_c$, respectively. Unless otherwise noted, the reflecting face of the lens mirror is planar.

In each example, two kinds of aberration were estimated; one is curvature of the field, which is plotted by a dashed line for the main scanning direction (the direction in which the scanning plane is scanned by a beam spot) and by a solid line for the sub-scanning direction (crossing the main scanning direction at right angles), and the other aberration is scanning linearity. In the usual case of an fθ lens, scanning linearity is expressed by percent departure of the image height from the ideal value y=fθ. However, in the present invention in which the entrance face $S_1$ and exit face $S_3$ of the lens mirror 3 are rotated, the ideal image height is not equal to fθ. As an alternative, an equivalent method of notation is adopted, in which the image height is assumed to vary by a rate $\zeta$ as a function of the angle of rotation ($2\omega$) of the lens mirror 3 for paraxial rays and the departure from the ideal image height Y=$\zeta\theta$ is expressed in terms of percentage. As for optics in which the aberrations that occur are asymmetric with respect to the scan center, those aberrations were plotted in graphs for the entire width of scanning. The design wavelength is 780 nm for all examples.

EXAMPLE 1

Figure 8:
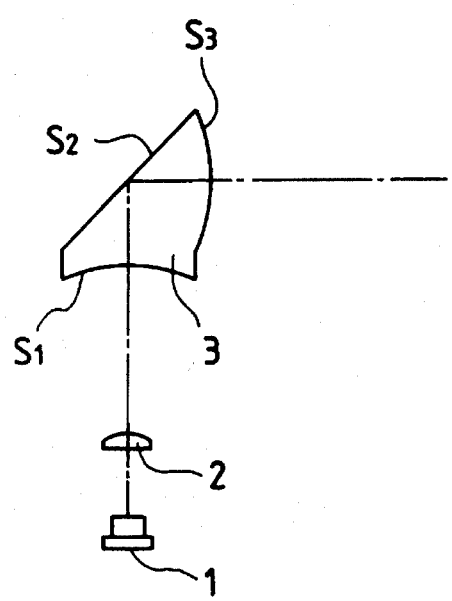
FIG. 8 shows the optics in the beam scanning apparatus of Example 1.

FIG. 8 shows a cross section of the beam scanning apparatus of Example 1 as it is taken in the main scanning direction. As shown, the entrance face $S_1$ of the lens mirror 3 is concave whereas the exit face $S_3$ is convex. A light beam collimated by the collimator lens 2 is launched into the lens mirror 3. The optical specifications of a representative design for Example 1 are shown below:

| Surface | Radius of curvature | Distance between faces | Refractive index |
|---|---|---|---|
| | $2\omega = 29.4°$ | | |
| $S_1$ | $r_1 = -8.010$ | $d_1 = 20.000$ | $n_1 = 1.48261$ |
| $S_2$ | $r_2 = \infty$ | $d_2 = 20.000$ | $n_2 = 1.48261$ |
| $S_3$ | $r_3 = -18.191$ | $d_3 = 280.000$ | |

The first face is aspheric having the following aspheric coefficients:

$K_1 = -0.52095$ $A_1 = -3.34624 \times 10^{-5}$ $B_1 = 0$

Figure 9A:
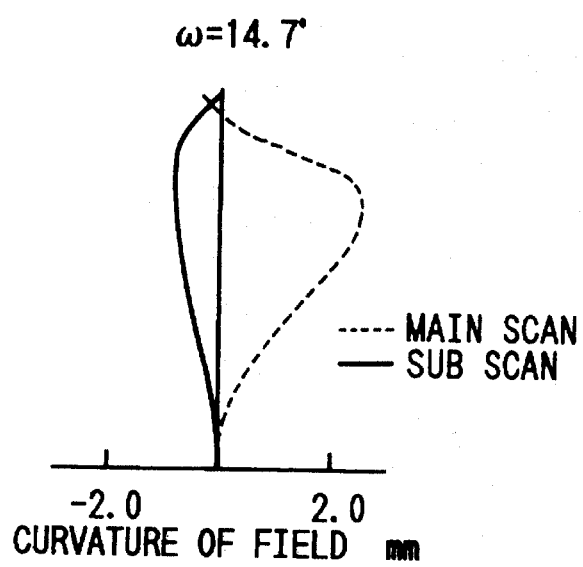
FIGS. 9(a) and 9(b) are graphs plotting the aberrations that occur in the optics shown in FIG. 8.
Figure 9B:
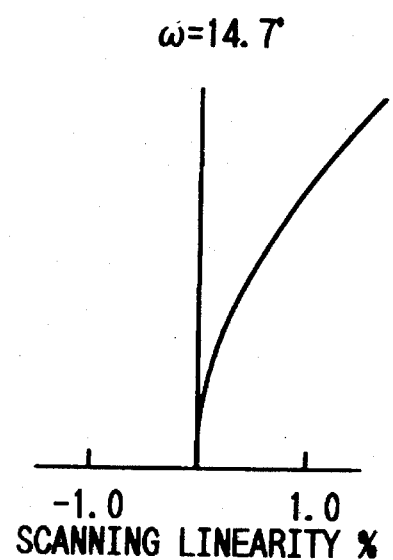

FIGS. 9(a) and 9(b) are graphs plotting the aberrations that occur in the design of Example 1. Obviously, effective correction was achieved for both curvature of the field (±3 mm and less) and scanning linearity (2% and less).

EXAMPLE 2

Figure 10:
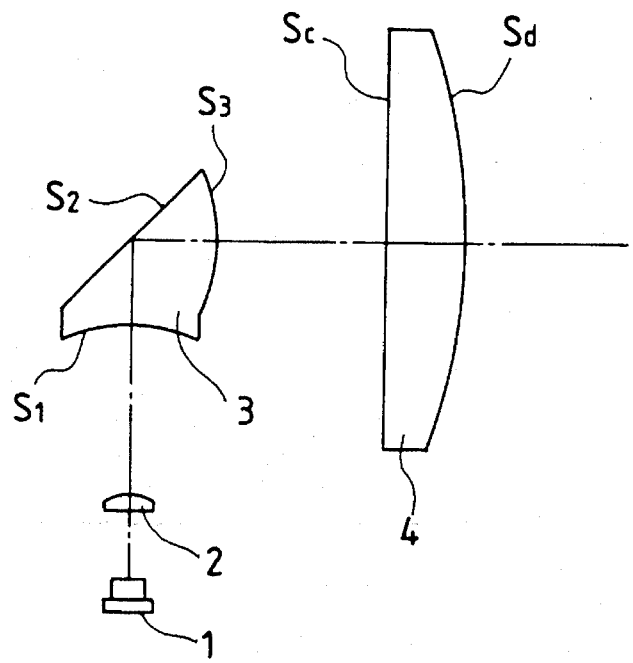
FIG. 10 shows the optics in the beam scanning apparatus of Example 2.

FIG. 10 shows a cross section of the beam scanning apparatus of Example 2 as it is take in the main scanning direction. As shown, the entrance face $S_1$ of the lens mirror 3 is concave whereas the exit face $S_3$ is convex. Example 2 differs from Example 1 in that an imaging lens 4 is inserted. A light beam collimated by the collimator lens 2 is launched into the lens mirror 3. The optical specifications of a representative design for Example 2 are shown below:

| Surface | Radius of curvature | Distance between faces | Refractive index |
|---|---|---|---|
| | $2\omega = 40.6°$ | | |
| $S_1$ | $r_1 = -26.450$ | $d_1 = 10.000$ | $n_1 = 1.51118$ |
| $S_2$ | $r_2 = \infty$ | $d_2 = 10.000$ | $n_2 = 1.51118$ |
| $S_3$ | $r_3 = -44.508$ | $d_3 = 16.746$ | |
| $S_c$ | $r_c = -673.340$ | $d_c = 8.567$ | $n_c = 1.51118$ |
| $S_d$ | $r_d = -52.646$ | $d_d = 185.752$ | |

Figure 11A:
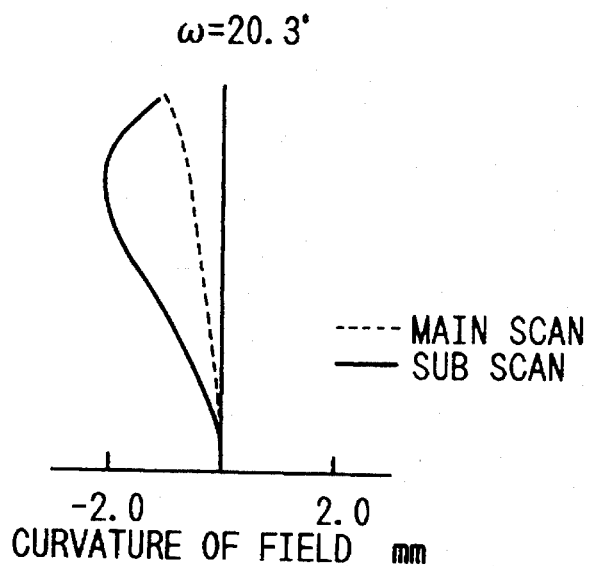
FIGS. 11(a) and 11(b) are graphs plotting the aberrations that occur in the optics shown in FIG. 10.
Figure 11B:
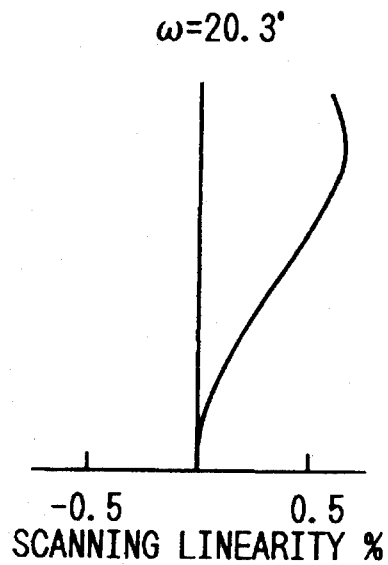

FIG. 11 is a drawing that contains graphs plotting the aberrations that occur in the design of Example 2. Because of the insertion of the imaging lens 4, the system of Example 2 achieved even more satisfactory correction of aberrations than the system of Example 1.

EXAMPLE 3

Figure 12:
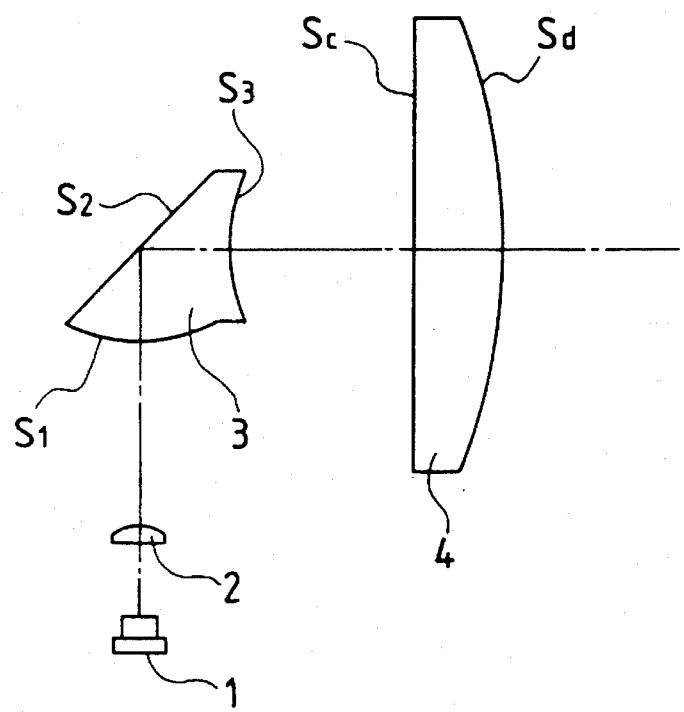
FIG. 12 shows the optics in the beam scanning apparatus of Example 3.

FIG. 12 shows a cross section of the beam scanning apparatus of Example 3 as it is taken in the main scanning direction. As shown, the entrance face $S_1$ of the lens mirror 3 is convex whereas the exit face $S_3$ is concave. Example 3 also differs from Example 1 in that an imaging lens 4 is inserted. A light beam collimated by the collimator lens 2 is launched into the lens mirror 3. If the focal length of the collimator lens 2 is the same, the optical power emitted from the semiconductor laser 1 is utilized more efficiently as the diameter of the collimated light beam increases. If, as in Example 3, the entrance face $S_1$ of the lens mirror 3 is convex whereas the exit face $S_3$ is concave, the incident light beam launched into the lens mirror 3 is converged by the entrance face $S_1$, thereby enabling the beam scanning apparatus to produce an increased optical power efficiency with the incident light beam having a larger diameter than the emerging light beam. The optical specifications of a representative design for Example 3 are shown below:

| Surface | Radius of curvature | Distance between faces | Refractive index |
|---|---|---|---|
| | $2\omega = 36.0°$ | | |
| $S_1$ | $r_1 = 41.308$ | $d_1 = 10.000$ | $n_1 = 1.48261$ |
| $S_2$ | $r_2 = \infty$ | $d_2 = 10.000$ | $n_2 = 1.48261$ |
| $S_3$ | $r_3 = 26.856$ | $d_3 = 21.299$ | |
| $S_c$ | $r_c = -1160.326$ | $d_c = 13.221$ | $n_c = 1.51118$ |
| $S_d$ | $r_d = -52.375$ | $d_d = 175.481$ | |

Figure 13A:
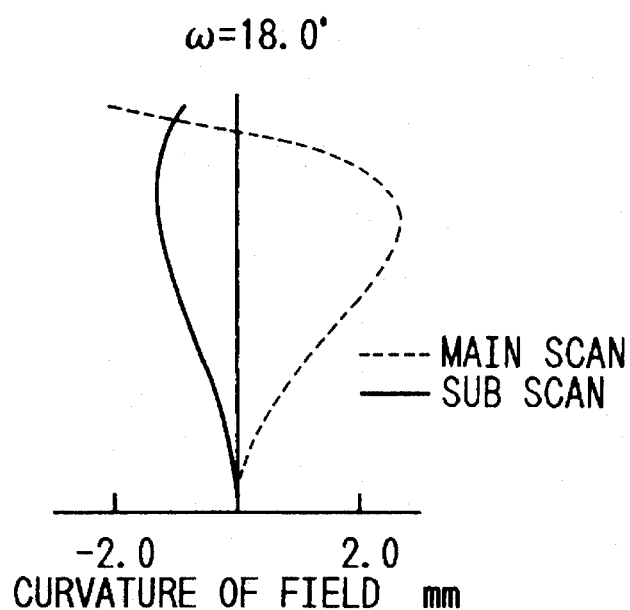
FIGS. 13(a) and 13(b) are graphs plotting the aberrations that occur in the optics shown in FIG. 12.
Figure 13B:
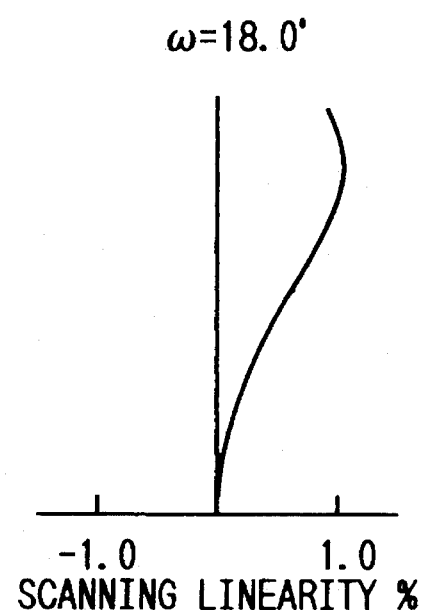

FIG. 13 is a drawing that contains graphs plotting the aberrations that occur in the design of Example 3.

EXAMPLE 4

Figure 14:
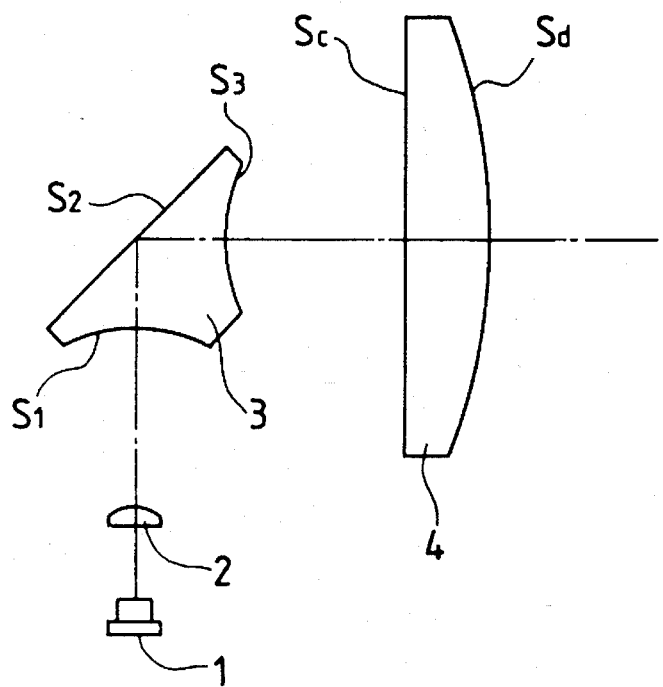
FIG. 14 shows the optics in the beam scanning apparatus of Example 4.

FIG. 14 shows a cross section of the beam scanning apparatus of Example 4 as it is taken in the main scanning direction. Example 4 differs from Example 1 in that the entrance face $S_1$ and exit face $S_3$ of the lens mirror 3 are both concave and that an imaging lens 4 is inserted. A light beam collimated by the collimator lens 2 is launched into the lens mirror 3. The optical specifications of a representative design for Example 4 are shown below:

| Surface | Radius of curvature | Distance between faces | Refractive index |
|---|---|---|---|
| | $2\omega = 42.5°$ | | |
| $S_1$ | $r_1 = -150.000$ | $d_1 = 10.000$ | $n_1 = 1.51118$ |
| $S_2$ | $r_2 = \infty$ | $d_2 = 10.000$ | $n_2 = 1.51118$ |
| $S_3$ | $r_3 = 150.000$ | $d_3 = 18.903$ | |
| $S_c$ | $r_c = -1208.816$ | $d_3 = 13.025$ | $n_c = 1.51118$ |
| $S_d$ | $r_d = -43.825$ | $d_d = 177.436$ | |

The face d is aspheric having the following aspheric coefficients:

$K_d = -0.35701$ $A_d = 0$ $B_d = 0$

Figure 15A:
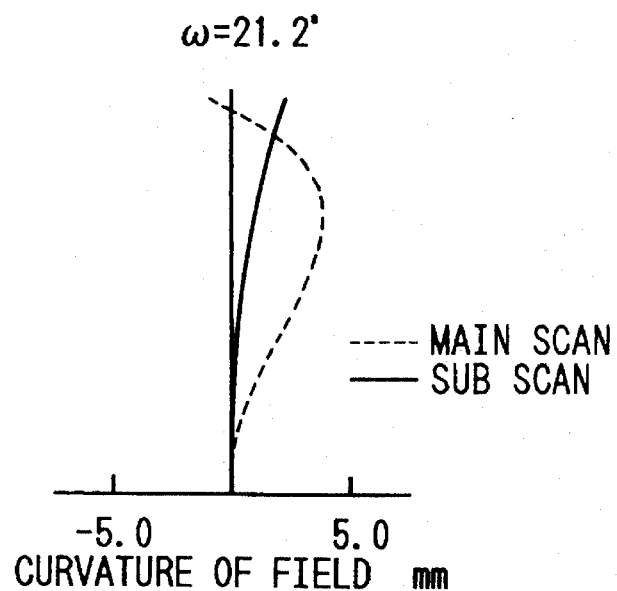
FIGS. 15(a) and 15(b) are graphs plotting the aberrations that occur in the optics shown in FIG. 14.
Figure 15B:
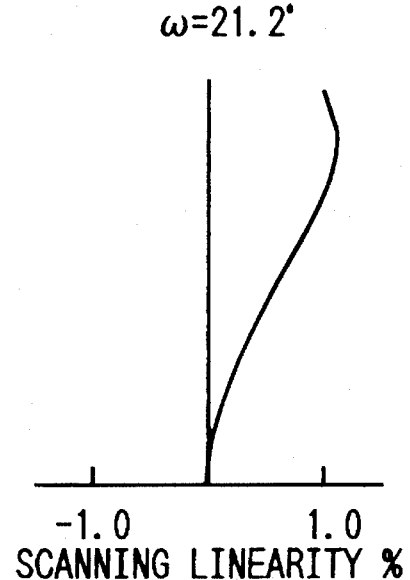

FIGS. 15(a) and 15(b) are graphs plotting the aberrations that occur in the design of Example 4.

EXAMPLE 5

Figure 16:
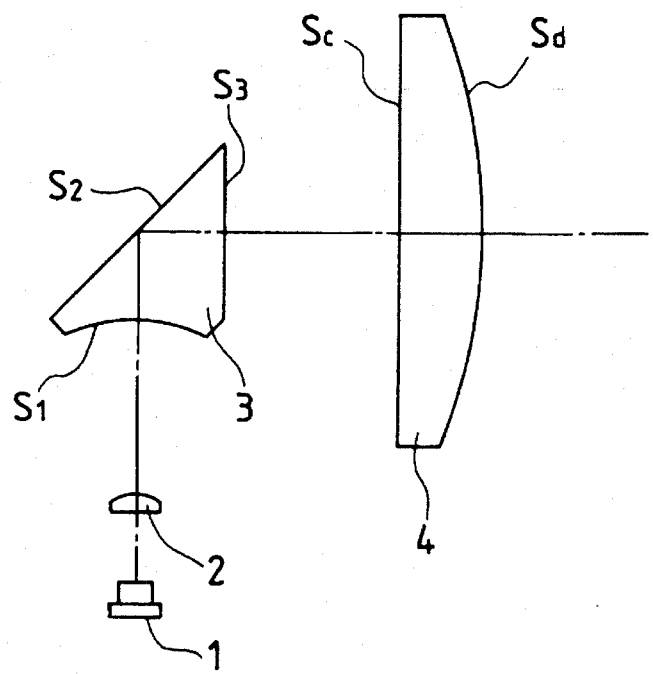
FIG. 16 shows the optics in the beam scanning apparatus of Example 5.

FIG. 16 shows a cross section of the beam scanning apparatus of Example 5 as it is taken in the main scanning direction. Example 5 differs from Example 1 in that the entrance face $S_1$ of the lens mirror 3 is concave whereas the exit face $S_3$ is planar and that an imaging lens 4 is inserted. A light beam collimated by the collimator lens 2 is launched into the lens mirror 3. If either the entrance face $S_1$ or the exit face $S_3$ of the lens mirror 3 or both faces are made planar as in Example 5, the lens mirror 3 can be manufactured easily at a lower cost. It should also be mentioned that if one optical component has two curved optical surfaces, the precision of relative positions of their optical axes becomes a problem, demanding exact agreement between the two optical axes. This problem is eliminated if the lens mirror 3 has a planar surface on either the entrance face $S_1$ or the exit face $S_3$ or both. The optical specifications of a representative design for Example 5 are shown below:

| | 2ω = 42.1° | | |
|---|---|---|---|
| Surface | Radius of curvature | Distance between faces | Refractive index |
| $S_1$ | $r_1 = -79.816$ | $d_1 = 10.000$ | $n_1 = 1.51118$ |
| $S_2$ | $r_2 = \infty$ | $d_2 = 10.000$ | $n_2 = 1.51118$ |
| $S_3$ | $r_3 = \infty$ | $d_3 = 18.849$ | |
| $S_c$ | $r_c = -1360.434$ | $d_c = 12.430$ | $n_c = 1.51118$ |
| $S_d$ | $r_d = -46.291$ | $d_d = 178.680$ | |

The face d is aspheric having the following aspheric coefficients:

$K_d = -0.36146$
$A_d = 0$
$B_d = 0$

Figure 17A:
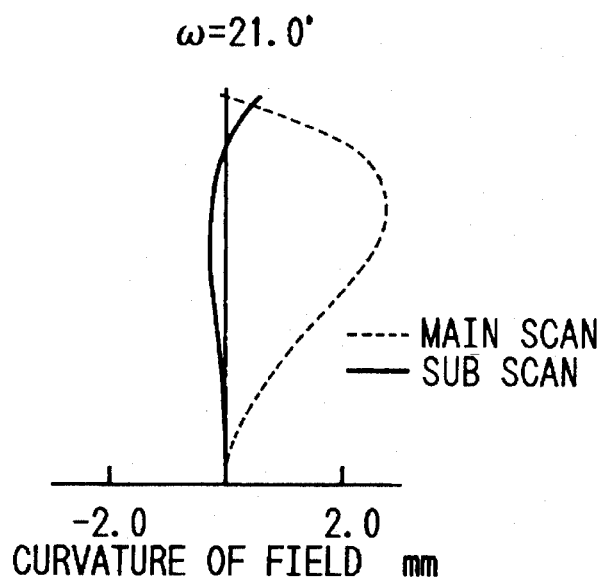
FIGS. 17(a) and 17(b) are graphs plotting the aberrations that occur in the optics shown in FIG. 16.
Figure 17B:
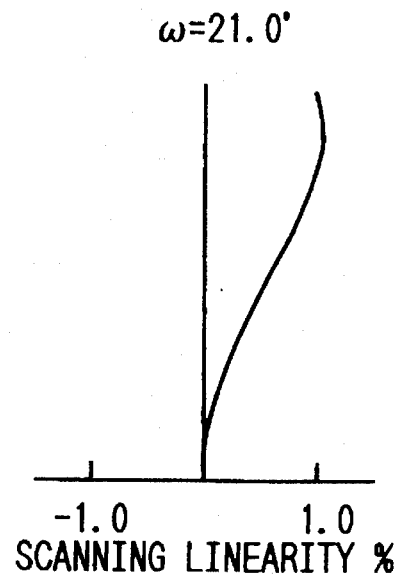

FIGS. 17(a) and 17(b) are graphs plotting the aberrations that occur in the design of Example 5.

EXAMPLE 6

Figure 18:
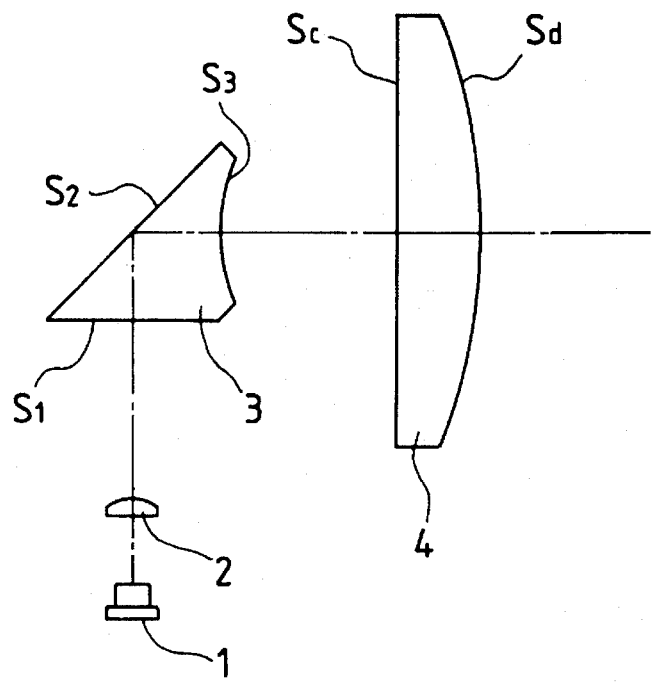
FIG. 18 shows the optics in the beam scanning apparatus of Example 6.

FIG. 18 shows a cross section of the beam scanning apparatus of Example 6 as it is taken in the main scanning direction. Example 6 differs from Example 1 in that the entrance face $S_1$ of the lens mirror 3 is planar whereas the exit face $S_3$ is concave and that an imaging lens 4 is inserted. A light beam collimated by the collimator lens 2 is launched into the lens mirror. The optical specifications of a representative design for Example 6 are shown below:

| | 2ω = 40.0° | | |
|---|---|---|---|
| Surface | Radius of curvature | Distance between faces | Refractive index |
| $S_1$ | $r_1 = \infty$ | $d_1 = 10.000$ | $n_1 = 1.48261$ |
| $S_2$ | $r_2 = \infty$ | $d_2 = 10.000$ | $n_2 = 1.48261$ |
| $S_3$ | $r_3 = -82.947$ | $d_3 = 22.113$ | |
| $S_c$ | $r_c = -1995.159$ | $d_c = 8.347$ | $n_c = 1.51118$ |
| $S_d$ | $r_d = -47.202$ | $d_d = 179.540$ | |

The face d is aspheric having the following aspheric coefficients:

$K_d = -0.38052$
$A_d = 0$
$B_d = 0$

Figure 19A:
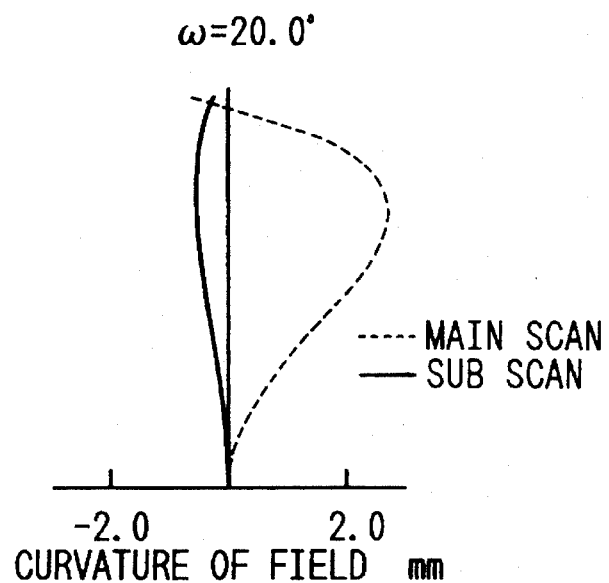
FIGS. 19(a) and 19(b) are graphs plotting the aberrations that occur in the optics shown in FIG. 18.
Figure 19B:
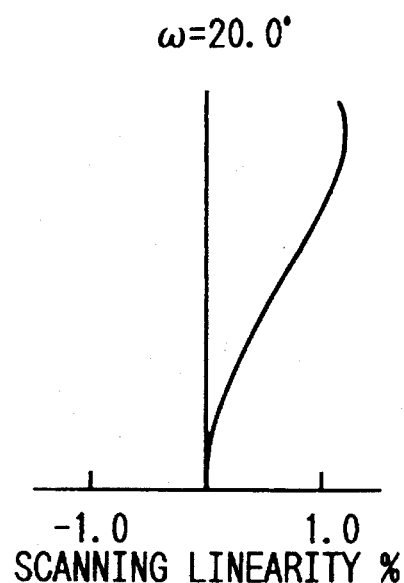

FIGS. 19(a) and 19(b) are graphs plotting the aberrations that occur in the design of Example 6.

EXAMPLE 7

Figure 20:
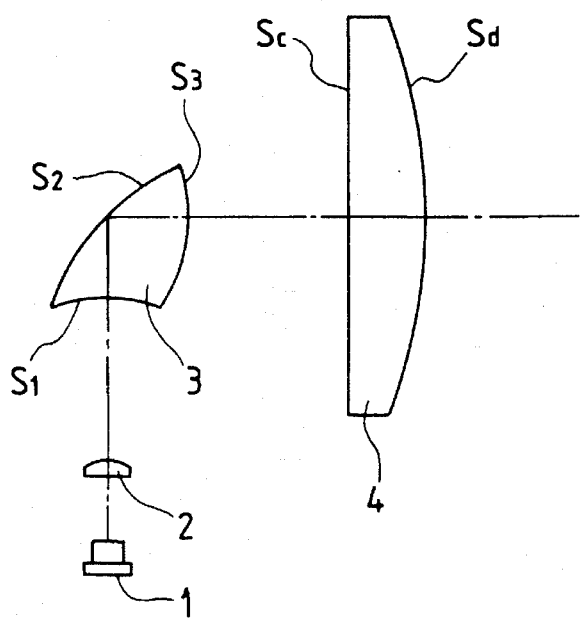
FIG. 20 shows the optics in the beam scanning apparatus of Example 7.

FIG. 20 shows a cross section of the beam scanning apparatus of Example 7 as it is taken in the main scanning direction. Example 7 differs from Example 1 in that the reflecting face $S_2$ of the lens mirror 3 is spherical and that an imaging lens 4 is inserted. A light beam collimated by the collimator lens 2 is launched into the lens mirror 3. If the reflecting face $S_2$ of the lens mirror 3 is rendered spherical as in Example 7, a higher degree of freedom is insured in optical design to provide better aberrational characteristics. It should be worth particular mention that since a light beam incident on the reflecting face $S_2$ is inclined with respect to the normal, astigmatism will develop but that it can be used to insure that the median of the variation in the amount of field curvature in the main scanning direction becomes substantially equal to that in the sub-scanning direction. As a result, the variation in the curvature of the field can be reduced to a sufficiently small value to provide satisfactory imaging characteristics. Example 7 has the added advantage that the astigmatism that occurs in the semiconductor laser 1 serving as a light source can be corrected by the astigmatism that develops on the reflecting face $S_2$.

The optical specifications of a representative design for Example 7 are shown below:

| | 2ω = 41.2° | | |
|---|---|---|---|
| Surface | Radius of curvature | Distance between faces | Refractive index |
| $S_1$ | $r_1 = -28.449$ | $d_1 = 10.000$ | $n_1 = 1.48261$ |
| $S_2$ | $r_2 = -50276.703$ | $d_2 = 10.000$ | $n_2 = 1.48261$ |
| $S_3$ | $r_3 = -48.900$ | $d_3 = 12.555$ | |
| $S_c$ | $r_c = -509.308$ | $d_c = 16.092$ | $n_c = 1.51118$ |
| $S_d$ | $r_d = -51.262$ | $d_d = 181.353$ | |

Figure 21A:
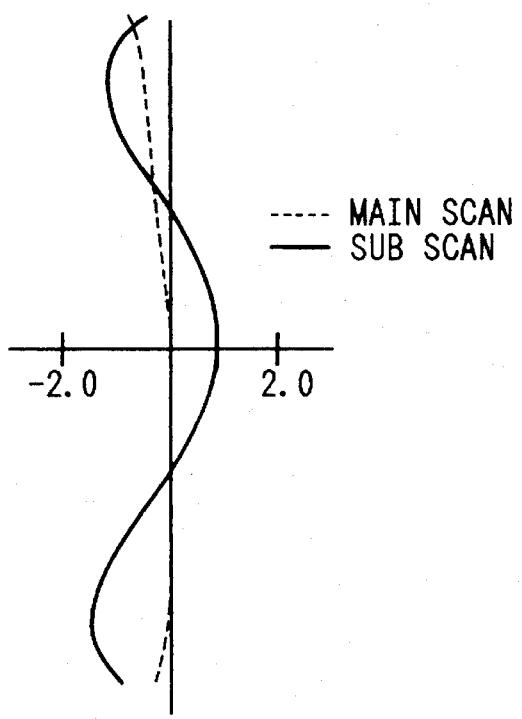
FIGS. 21(a) and 21(b) are graphs plotting the aberrations that occur in the optics shown in FIG. 20.
Figure 21B:
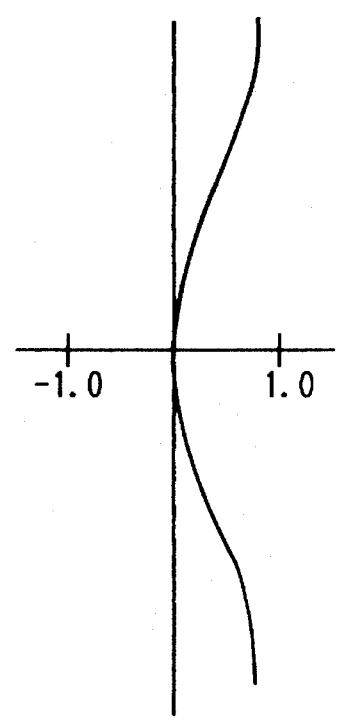

FIGS. 21(a) and 21(b) are graphs plotting the aberrations that occur in the design of Example 7. Obviously, the median of the variation in the amount of field curvature in the main scanning direction is in substantial agreement with that in the sub-scanning direction.

EXAMPLE 8

The beam scanning apparatus of Example 8 is characterized in that the entrance face $S_1$ of the lens mirror 3 is aspheric, with an imaging lens being inserted. A light beam collimated by the collimator lens is launched into the lens mirror 3. If, as in Example 8, either the entrance face $S_1$ or the exit face $S_3$ of the lens mirror 3 or both faces are rendered aspheric, aberrations can be corrected in a satisfactory manner to insure that the beam scanning apparatus provides remarkable optical characteristics. To manufacture an aspheric surface at low cost, the use of a plastic lens is recommended. In this connection, making the lens mirror 3 from plastic materials is particularly desired since it is effective in reducing the rotational load.

The optical specifications of a representative design for Example 8 are shown below:

| | 2ω = 42.0° | | |
|---|---|---|---|
| Surface | Radius of curvature | Distance between faces | Refractive index |
| $S_1$ | $r_1 = -24.483$ | $d_1 = 10.000$ | $n_1 = 1.52361$ |
| $S_2$ | $r_2 = \infty$ | $d_2 = 10.000$ | $n_2 = 1.52361$ |
| $S_3$ | $r_3 = -41.461$ | $d_3 = 16.548$ | |
| $S_c$ | $r_c = -398.651$ | $d_c = 10.818$ | $n_c = 1.52361$ |
| $S_d$ | $r_d = -50.332$ | $d_d = 183.449$ | |

The entrance face of the rotating lens mirror has the following aspheric coefficients:

$K_1 = -0.92373$
$A_1 = 0$
$B_1 = 0$

Figure 22A:
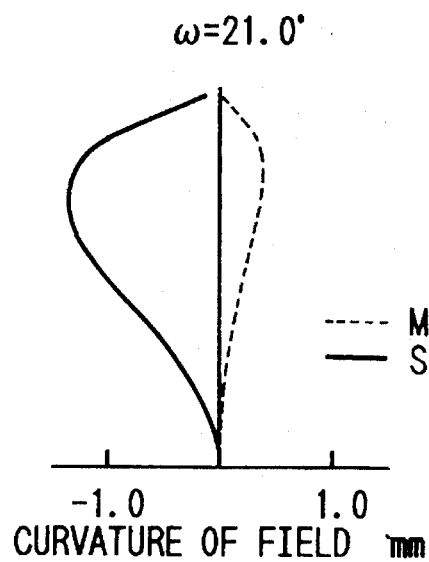
FIGS. 22(a) and 22(b) are graphs plotting the aberrations that occur in the optics of the beam scanning apparatus of Example 8.
Figure 22B:
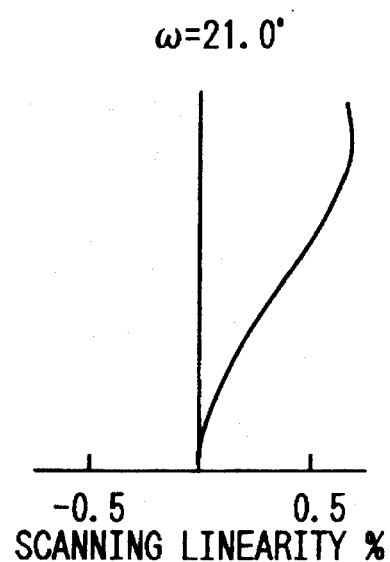

FIGS. 22(a) and 22(b) are graphs plotting the aberrations that occur in the design of Example 8.

EXAMPLE 9

Figure 23A:
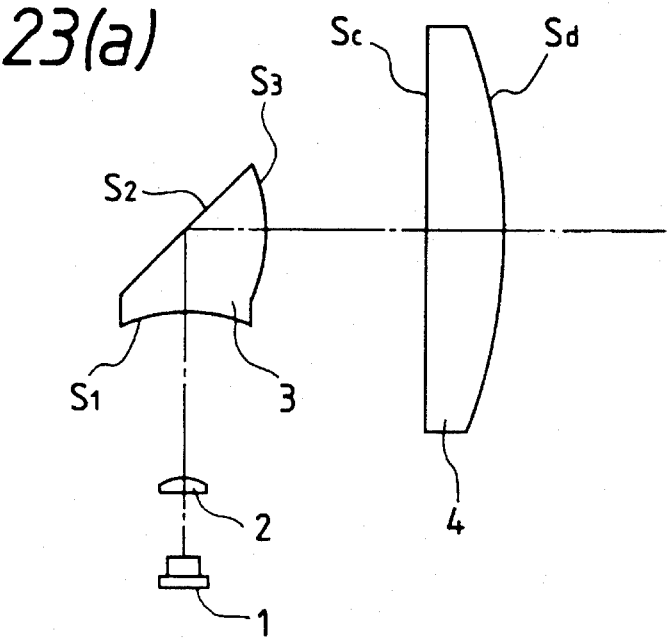
FIG. 23(a) shows cross section of the optics in the beam scanning apparatus of Example 9 as it is taken in the main scanning direction.
Figure 23B:
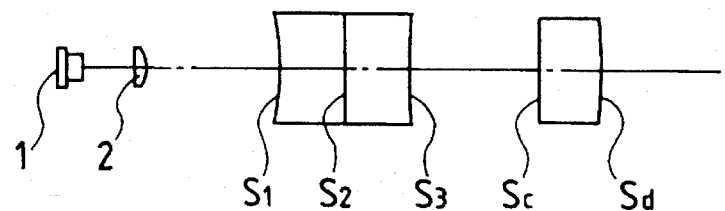
FIG. 23(b) shows a cross section of the same optics as it is taken in the sub-scanning direction.

FIG. 23 is a drawing that shows the beam scanning apparatus of Example 9; FIG. 23(a) shows a cross section as taken in the main scanning direction and FIG. 23(b) is a cross section as taken in the sub-scanning direction and developed with respect to the reflecting face $S_2$.

In Example 9, the entrance face $S_1$ and exit face $S_3$ of the lens mirror 3 are both toric, with an imaging lens 4 being inserted. A light beam collimated by the collimator lens 2 is launched into the lens mirror 3. If, as in Example 9, either the entrance face $S_1$ or the exit face $S_3$ of the lens mirror 3 or both faces are rendered toric to construct anamorphic scanning optics, aberrations can be corrected independently in the main and sub-scanning directions, thereby assuring excellent aberrational characteristics. Another advantage of the anamorphic optics is that it provides ease in performing an optical design for correcting the astigmatism that develops in the semiconductor laser 1 serving as the light source. According to another effective approach, only one of the two axially symmetric optical surface that compose the scanning optics may be rendered toric with slightly different curvatures being provided in two crossed directions to correct the astigmatism that develops in the semiconductor laser 1.

The optical specifications of a representative design for Example 9 are shown below:

| Surface | Radius of curvature | Distance between faces | Refractive index |
|---|---|---|---|
| | $2\omega = 41.1°$ | | |
| $S_1$ | $rx_1 = -80.743$<br>$ry_1 = -26.030$ | $d_1 = 10.000$ | $n_1 = 1.52361$ |
| $S_2$ | $r_2 = \infty$ | $d_2 = 10.000$ | $n_2 = 1.52361$ |
| $S_3$ | $rx_3 = 352.324$<br>$ry_3 = -61.839$ | $d_3 = 10.000$ | |
| $S_c$ | $r_c = -256.533$ | $d_c = 8.044$ | $n_c = 1.52361$ |
| $S_d$ | $r_d = -38.048$ | $d_d = 192.658$ | |

Figure 24A:
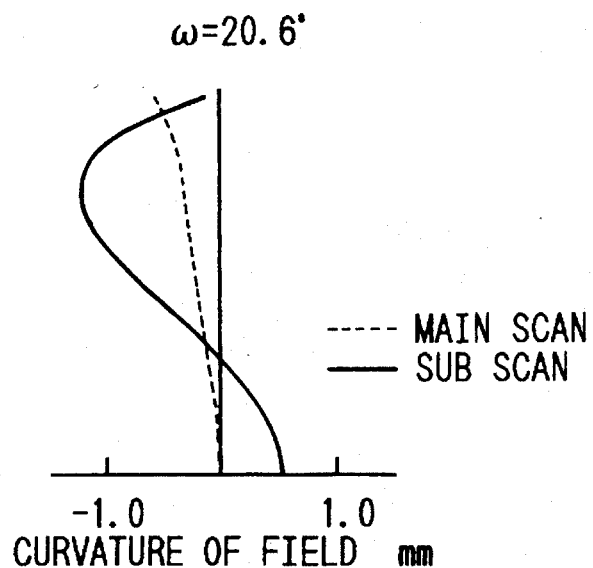
FIGS. 24(a) and 24(b) are graphs plotting the aberrations that occur in the optics shown in FIG. 23.
Figure 24B:
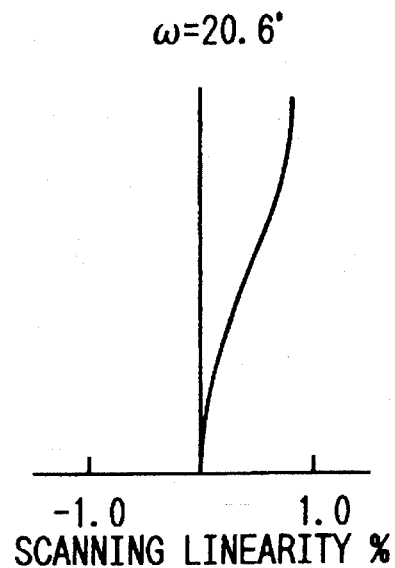

FIGS. 24(a) and 24(b) are graphs plotting the aberrations that occur in the design of Example 9.

EXAMPLE 10

The beam scanning apparatus of Example 10 is characterized by the optical specifications of the lens mirror 3 that are set in such a way that despite variations in the refractive index of the lens mirror, the focal length of the scanning optics remains the same and, at the same time, the position of the image plane is invariable. Furthermore, an imaging lens is inserted and a light beam collimated by the collimator lens is launched into the lens mirror 3.

Let us here derive the condition that should be satisfied by the lens mirror 3 in order to insure that variations in the refractive index of the mirror will not affect the focal length of the overall system. The power $\phi$ of the lens mirror 3 is expressed by:

$$\phi = (N-1)\left(\frac{1}{R_1} - \frac{1}{R_2}\right) + \frac{(N-1)^2}{N} \cdot \frac{D}{R_1 R_2}$$

wherein $R_1$ and $R_2$ are the radii of curvature of the entrance face $S_1$ and the exit face $S_3$, respectively, of the lens mirror 3; D is the on-axis distance between entrance face $S_1$ and exit face $S_3$; and N is the refractive index of the lens mirror 3. If the power $\phi$ does not change despite a variation in the refractive index N, $$\frac{d\phi}{dN} = 0.$$

Therefore, the condition for the freedom from the effect of variations in the refractive index is:

$$\frac{R_1 - R_2}{D} + \frac{1}{N^2} = 1$$

If this condition is satisfied, the focal length of the overall system remains the same and the focal plane will not vary even if temperature variations and other environmental changes cause variations in the refractive index of the lens mirror 3. As a result, there is provided a beam scanning apparatus that operates very stably in the face of environmental variations and which exhibits satisfactory optical characteristics at all times. It should particularly be mentioned that since the lens mirror 3 has a special geometry that is quite different from ordinary optical lenses, it is desirably manufactured by the molding of optical plastics; however, optical plastics are subject to great variations in the refractive index caused by temperature changes and, hence, it is effective to determine the settings of the lens mirror 3 in such a way that the condition specified above is practically satisfied.

The optical specifications of a representative design for Example 10 are shown below:

| Surface | Radius of curvature | Distance between faces | Refractive index |
|---|---|---|---|
| | $2\omega = 39.4°$ | | |
| $S_1$ | $r_1 = -21.780$ | $d_1 = 10.000$ | $n_1 = 1.51118$ |
| $S_2$ | $r_2 = \infty$ | $d_2 = 10.000$ | $n_2 = 1.51118$ |
| $S_3$ | $r_3 = -33.022$ | $d_3 = 16.910$ | |
| $S_c$ | $r_c = 4242.637$ | $d_c = 7.719$ | $n_c = 1.51118$ |
| $S_d$ | $r_d = -67.663$ | $d_d = 186.633$ | |

Figure 25A:
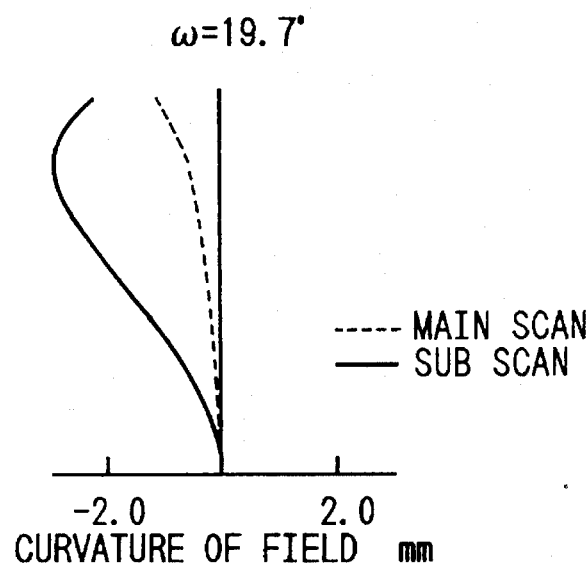
FIGS. 25(a) and 25(b) are graphs plotting the aberrations that occur in the optics of the beam scanning apparatus of Example 10.
Figure 25B:
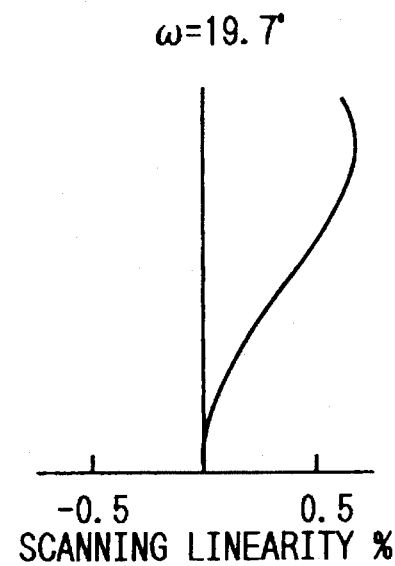

With this design, the left side of the equation setting forth the condition for freedom from the effect of variations in the refractive index assumes the value 1.0000. FIGS. 25(a) and 25(b) are graphs plotting the aberrations that occur in the design of Example 10.

EXAMPLE 11

Figure 26:
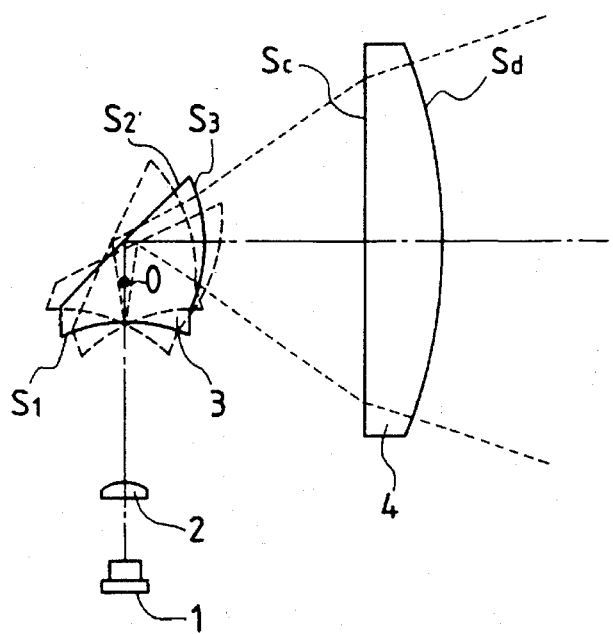
FIG. 26 shows the optics in the beam scanning apparatus of Example 11.

FIG. 26 shows a cross section of the beam scanning apparatus of Example 11 as it is taken in the main scanning direction. In this example, the rotating center O of the lens mirror 3 is located inward of the reflecting face $S_2$ and an imaging lens 4 is also inserted. A light beam collimated by collimator lens 2 is launched into the lens mirror 3.

Figure 27A:
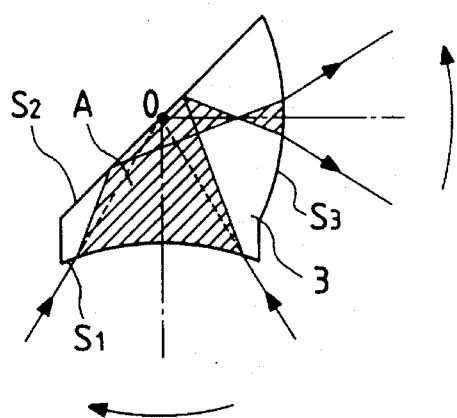
FIGS. 27(a) and 27(b) show how a light beam travels through the lens mirror in Examples 1 and 11, respectively.
Figure 27B:
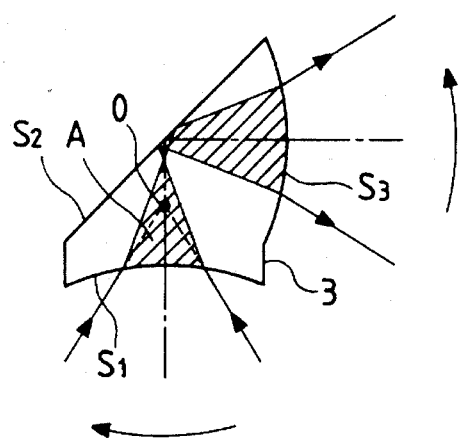

FIGS. 27(a) and 27(b) are diagrams comparing Examples 1 and 11 as regards the paths of a light beam that is deflected for scanning and travelling through the lens mirror 3. As is clear from the drawing, the lens mirror 3 in Example 1 rotates about the center O in the reflecting face $S_2$ and, hence, the light beam travels through a wide area A to provide a large effective aperture at the entrance face $S_1$, thereby limiting the angle through which the lens mirror 3 is rotated in association with the scan area. On the other hand, if, as in Example 11, the rotating center O is set to lie within the lens mirror 3, particularly on the optical axis near the midpoint between the entrance face $S_1$ and the reflecting face $S_2$, the effective aperture at the entrance face $S_1$ can reasonably be reduced and, at the same time, the effective aperture at the exit face $S_3$ will not increase very much. If the effective aperture is small, the rotating angle of the lens mirror 3 can be increased, thereby realizing a compact beam scanning apparatus that requires a shorter optical path. Another advantage of the small effective aperture is that it provides ease in assuring high precision for lens surfaces.

The optical specifications of a representative design for Example 11 are shown below:

| | 2ω = 41.4° | | |
|---|---|---|---|
| Surface | Radius of curvature | Distance between faces | Refractive index |
| $S_1$ | $r_1 = -21.267$ | $d_1 = 10.000$ | $n_1 = 1.51118$ |
| $S_2$ | $r_2 = \infty$ | $d_2 = 10.000$ | $n_2 = 1.51118$ |
| $S_3$ | $r_3 = -32.786$ | $d_3 = 19.091$ | |
| $S_c$ | $r_c = -2319.833$ | $d_c = 9.291$ | $n_c = 1.51118$ |
| $S_d$ | $r_d = -62.550$ | $d_d = 182.778$ | |

Figure 28A:
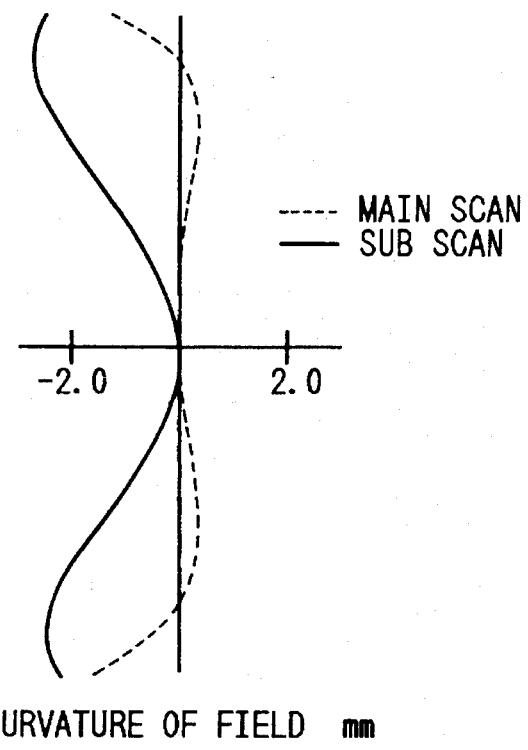
FIGS. 28(a) and 28(b) are graphs plotting the aberrations that occur in the optics shown in FIG. 26.
Figure 28B:
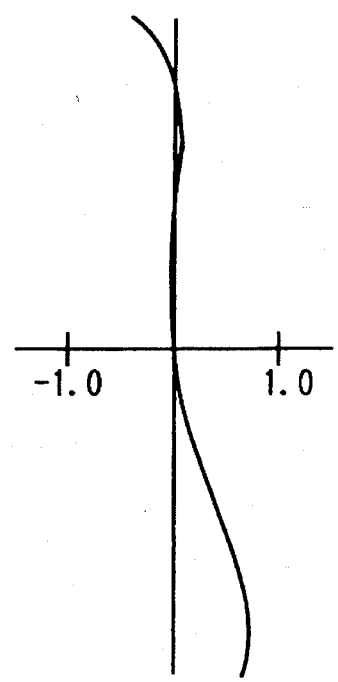

In this design, the rotating center O of the lens mirror 3 is located at a point 5 mm away from the entrance face $S_1$ towards the scanning plane along the optical axis. FIGS. 28(a) and 28(b) are graphs plotting the aberrations that occur in the design of Example 11.

EXAMPLE 12

Figure 29:
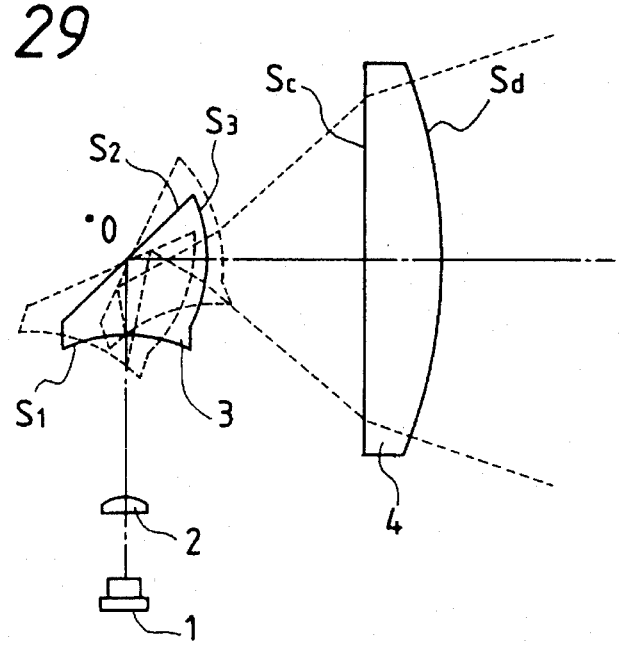
FIG. 29 shows the optics in the beam scanning apparatus of Example 12.

FIG. 29 shows a cross section of the beam scanning apparatus of Example 12 as it is taken in the main scanning direction. In this example, the lens mirror 3 has the rotating center O located in its exterior and an imaging lens 4 is inserted. A light beam collimated by the collimator lens 2 is launched into the lens mirror 3.

Figure 30:
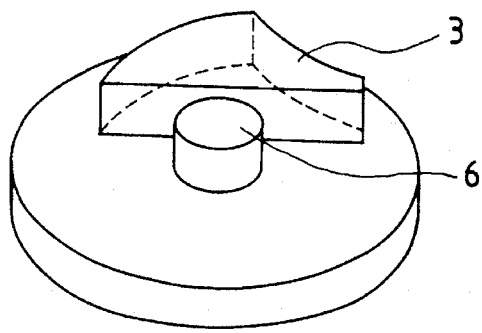
FIG. 30 is a perspective view showing the layout of the lens mirror in the same optics.
Figure 31:
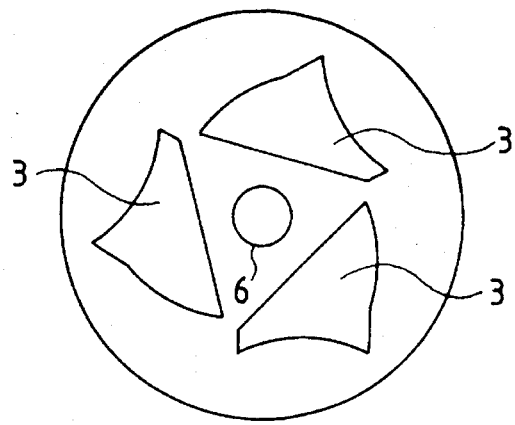
FIG. 31 is a perspective view showing an alternative layout of the lens mirror in the same optics.

If the rotating center 0 of the lens mirror 3 is located either on the reflecting face $S_2$ or in its interior, the lens mirror 3 must be installed further above the rotating shaft of the motor in order to avoid contact with it and this adds to the height of that portion. On the other hand, if, as in Example 12, the rotating center O of the lens mirror 3 is located exterior to it in such a position that the scanning light beam will not pass, the mirror 3 will not interfere with the rotating shaft 6 of the motor as shown in FIG. 30 and the height of that portion can accordingly be lowered. In the scanning optics, the deflector is the height of all of its portions, so reducing the height of that portion is advantageous for the purpose of realizing a compact system. Furthermore, it also becomes possible to arrange three or more lens mirrors 3 around the rotating shaft 6 as shown in FIG. 31 and this provides a favorable condition for increasing the scan speed. The structural feature under discussion is also advantageous for arranging a plurality of lens mirrors 3 with the angle between the optical axes of the entrance face $S_1$ and the exit face $S_3$ being reduced (namely, the angle α being increased) as already described with reference to FIG. 7. The optical specifications of a representative design for Example 12 are shown below:

| | 2ω = 40.0° | | |
|---|---|---|---|
| Surface | Radius of curvature | Distance between faces | Refractive index |
| $S_1$ | $r_1 = -32.377$ | $d_1 = 10.000$ | $n_1 = 1.51118$ |
| $S_2$ | $r_2 = \infty$ | $d_2 = 10.000$ | $n_2 = 1.51118$ |
| $S_3$ | $r_3 = -62.638$ | $d_3 = 14.373$ | |
| $S_c$ | $r_c = -410.915$ | $d_c = 8.287$ | $n_c = 1.51118$ |
| $S_d$ | $r_d = -46.642$ | $d_d = 188.374$ | |

Figure 32A:
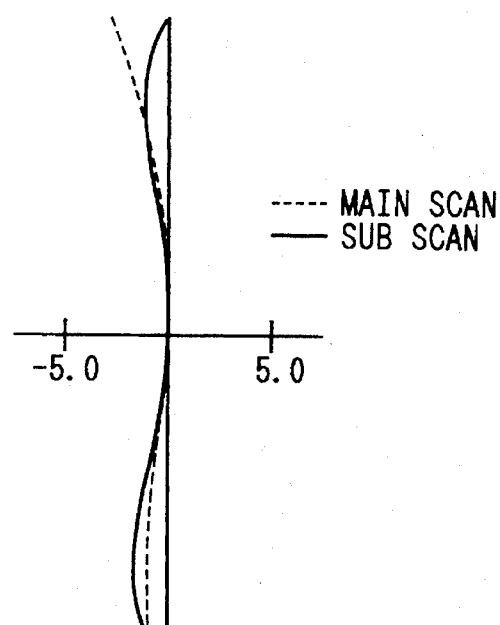
FIGS. 32(a) and 32(b) are graphs plotting the aberrations that occur in the optics shown in FIG. 29.
Figure 32B:
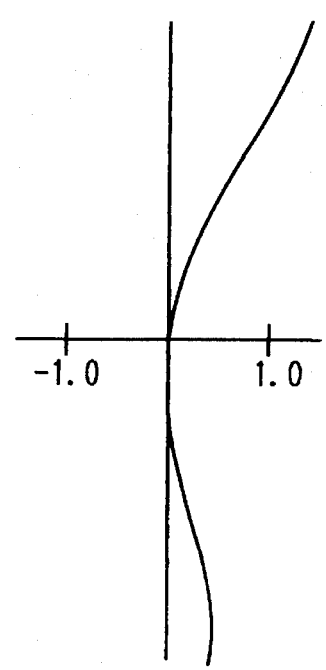

In this design, the rotating center O of the lens mirror 3 is on the side opposite the entrance face $S_1$ or the exit face $S_3$ with respect to the reflecting face $S_2$ and its position is 4.243 mm distant from the optical axis of the reflecting face $S_2$ in the normal direction. FIGS. 32(a) and 32(b) are graphs plotting the aberrations that occur in the design of Example 12.

EXAMPLE 13

Figure 33:
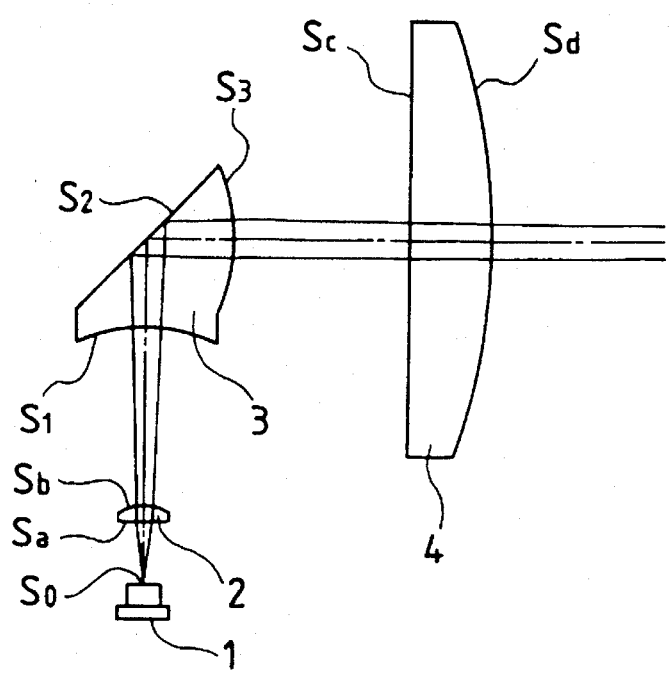
FIG. 33 shows the optics in the beam scanning apparatus of Example 13.

FIG. 33 shows a cross section of the beam scanning apparatus of Example 13 as it is taken in the main scanning direction. The drawing shows a light beam scanning at the scan center. In the apparatus of Example 13, a light beam from the semiconductor laser 1 that has passed through the collimator lens 2 is not parallel light but a slightly convergent beam is launched into the lens mirror 3. Hence, an imaging lens 4 is inserted in the apparatus.

As in the case of Example 13, the light beam to be launched into the lens mirror 3 need not be a completely collimated beam. If it is not absolutely necessary to produce a parallel light beam, there will be a greater latitude in optical design.

The optical specifications of a representative design for Example 13 are shown below:

| | 2ω = 54.1° | | |
|---|---|---|---|
| Surface | Radius of curvature | Distance between faces | Refractive index |
| $S_0$ | | $d_0 = 5.955$ | |
| $S_a$ | $r_a = \infty$ | $d_a = 2.000$ | $n_a = 1.51118$ |
| $S_b$ | $r_b = -4.089$ | $d_b = 30.000$ | |
| $S_1$ | $r_1 = -19.667$ | $d_1 = 10.000$ | $n_1 = 1.48261$ |
| $S_2$ | $r_2 = \infty$ | $d_2 = 10.000$ | $n_2 = 1.48261$ |
| $S_3$ | $r_3 = -24.157$ | $d_3 = 15.552$ | |
| $S_c$ | $r_c = -233.611$ | $d_c = 12.834$ | $n_c = 1.51118$ |
| $S_d$ | $r_d = -42.622$ | $d_d = 141.614$ | |

Figure 34A:
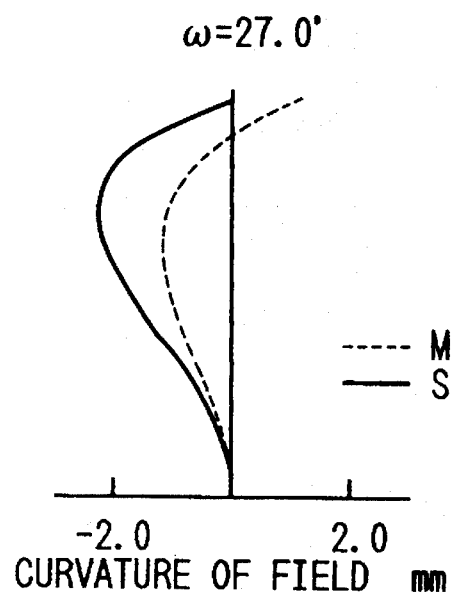
FIGS. 34(a) and 34(b) are graphs plotting the aberrations that occur in the optics shown in FIG. 33.
Figure 34B:
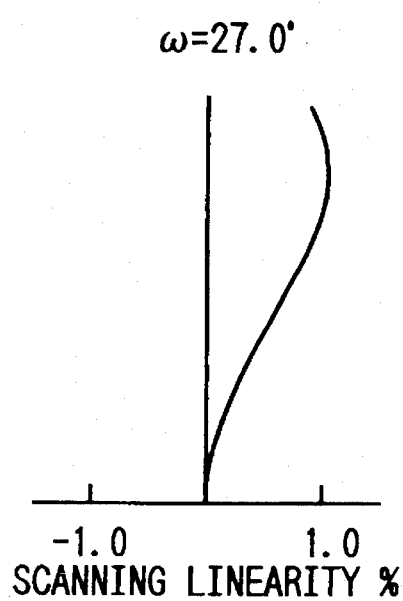

FIGS. 34(a) and 34(b) are graphs plotting the aberrations that occur in the design of Example 13.

EXAMPLE 14

Figure 35:
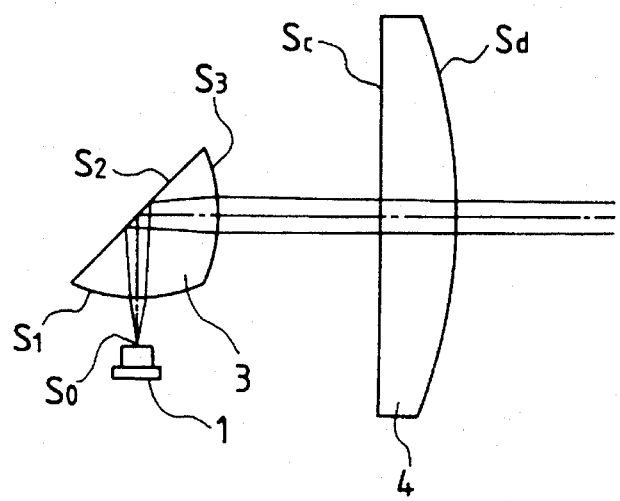
FIG. 35 shows the optics in the beam scanning apparatus of Example 14.

FIG. 35 shows a cross section of the beam scanning apparatus of Example 14 as it is taken in the main scanning direction. The drawing shows a light beam scanning at the scan center. In all of Examples 1 to 13, collimator lens 2 is used for transforming the divergent light from the semiconductor laser 1 into a parallel or near-parallel light beam. In contrast, the beam scanning apparatus of Example 14 does not use the collimator lens 2 but is allows the light beam from the semiconductor laser 1 to be directly launched into the lens mirror 3, with an imaging lens 4 being inserted.

Figure 36:
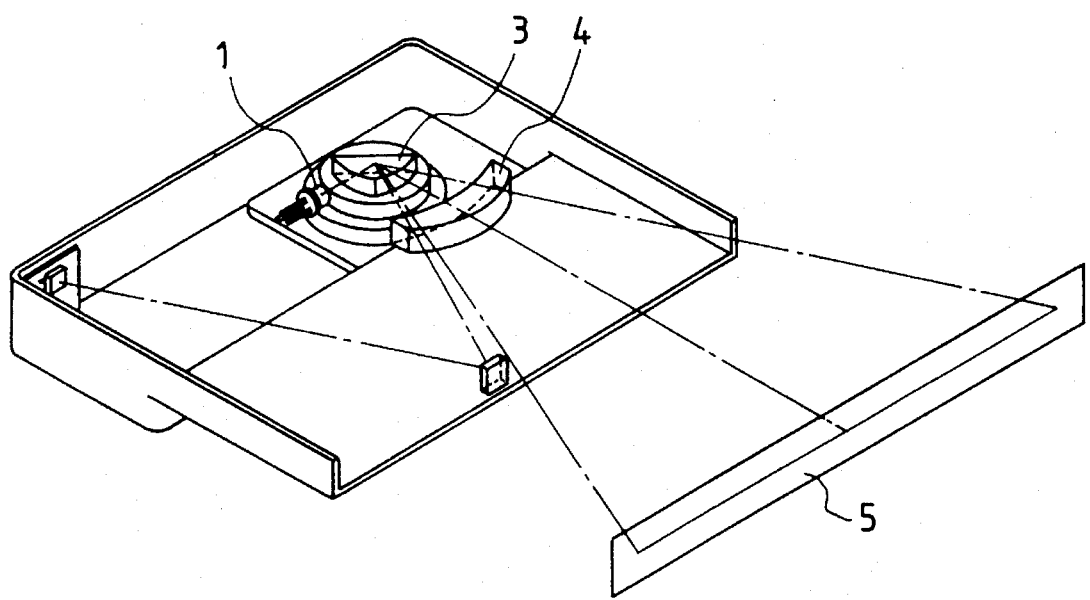
FIG. 36 is a perspective view of the same beam scanning apparatus.

As will be clear from FIG. 36, Example 14 has the advantage that the number of optical components to be used is sufficiently reduced to lower the parts cost and that, in addition, a compact apparatus can be assembled and adjusted easily. The optical specifications of a representative design for Example 14 are shown below.

| | 2ω = 40.2° | | |
|---|---|---|---|
| Surface | Radius of curvature | Distance between faces | Refractive index |
| $S_0$ | | $d_0 = 6.000$ | |
| $S_1$ | $r_1 = 16.493$ | $d_1 = 10.000$ | $n_1 = 1.48261$ |
| $S_2$ | $r_2 = \infty$ | $d_2 = 10.000$ | $n_2 = 1.48261$ |
| $S_3$ | $r_3 = -10.099$ | $d_3 = 27.745$ | |
| $S_c$ | $r_c = 15779.220$ | $d_c = 8.606$ | $n_c = 1.51118$ |
| $S_d$ | $r_d = -76.692$ | $d_d = 156.617$ | |

The first surface is aspheric and has the following aspheric coefficients:

$K_1 = -1.10820$
$A_1 = -1.61596 \times 10^{-4}$
$B_1 = 0$

Figure 37A:
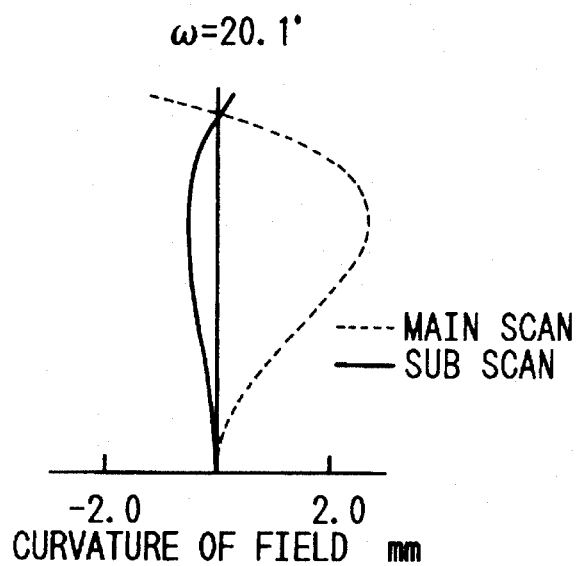
FIGS. 37(a) and 37(b) are graphs plotting the aberrations that occur in the optics shown in FIG. 35.
Figure 37B:
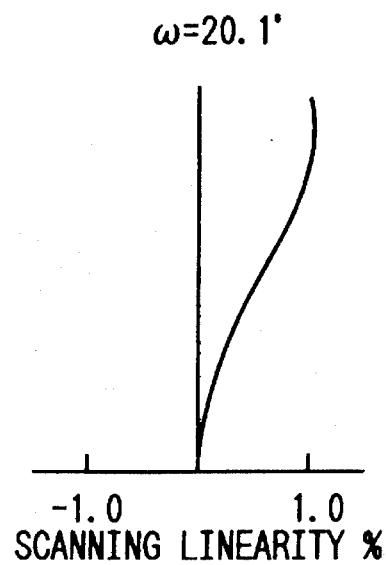

FIGS. 37(a) and 37(b) are graphs plotting the aberrations that occur in the design of Example 14.

EXAMPLE 15

Figure 38A:
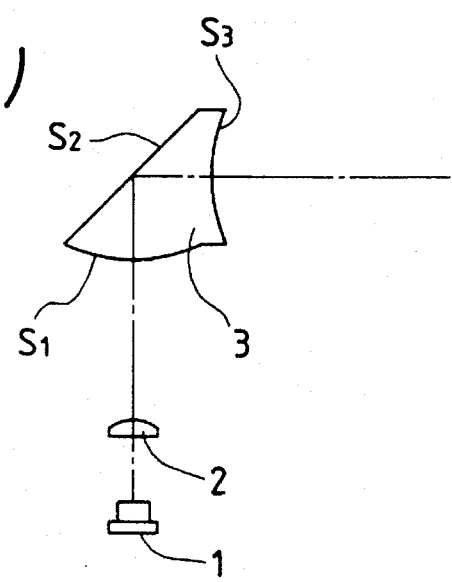
FIG. 38(a) shows a cross section of the optics in the beam scanning apparatus of Example 15 as it is taken in the main scanning direction.
Figure 38B:
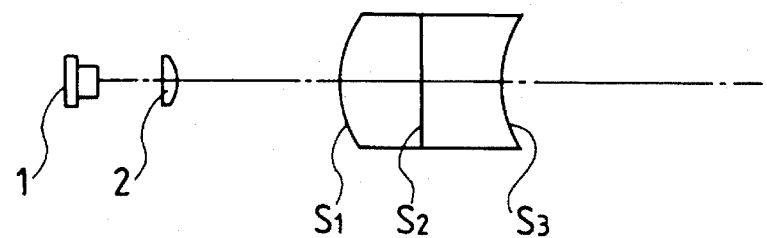
FIG. 38(b) shows a cross section of the same optics as it is taken in the sub-scanning direction.

FIG. 38 is a drawing that shows the beam scanning apparatus of Example 15; FIG. 38(a) shows a cross section as taken in the main scanning direction and FIG. 38(b) is a cross section as taken in the sub-scanning direction and developed with respect to the reflecting face $S_2$.

In this example, scanning quality at uniform speed is not considered and the apparatus is designed to correct only curvature of the field and astigmatism. The entrance face $S_1$ and exit face $S_3$ of the lens mirror 3 are both toric and the apparatus is so adapted that a light beam collimated by the collimator lens 2 is launched into the lens mirror 2.

As in this example, one need not consider the scanning quality at uniform speed and, instead, he may correct only curvature of the field and astigmatism. In this way, the two kinds of aberration can be corrected in a very efficient manner. For achieving high scanning quality at uniform speed, one may adopt any suitable method such as variable control over the clocking of a modulation signal to be supplied to the light source. The optical specifications of a representative design for Example 15 are shown below:

| | $2\omega = 22.9°$ | | |
|---|---|---|---|
| Surface | Radius of curvature | Distance between faces | Refractive index |
| $S_1$ | $rx_1 = 19.732$ $ry_1 = 29.943$ | $d_1 = 10.000$ | $n_1 = 1.51118$ |
| $S_2$ | $r_2 = \infty$ | $d_2 = 10.000$ | $n_2 = 1.51118$ |
| $S_3$ | $rx_3 = 14.733$ $ry_3 = 29.567$ | $d_3 = 211.207$ | |

Figure 39:
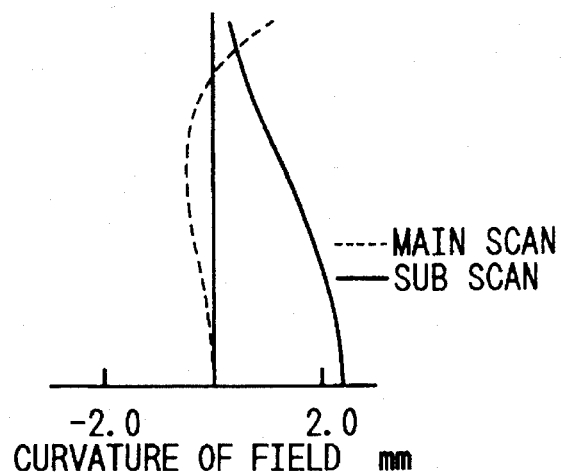
FIG. 39 a graph plotting the aberration that occurs in the optics shown in FIG. 38.

FIG. 39 is a graph plotting the field curvature that occurs in the design of Example 15. Since the scanning quality at uniform speed is not considered in this example, no graph is given that depicts the scanning linearity.

EXAMPLE 16

Figure 6B:
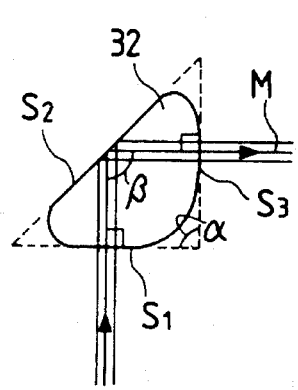
Figure 6C:
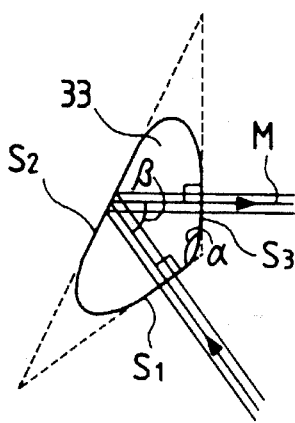
Figure 40:
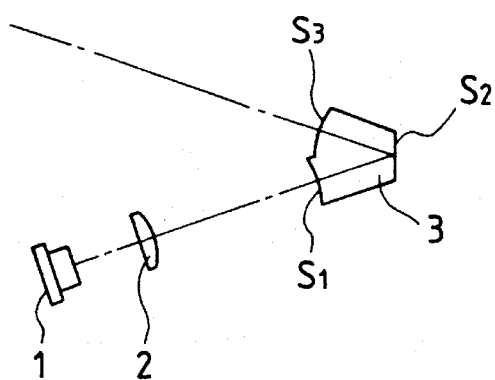
FIG. 40 shows the optics in the beam scanning apparatus of Example 16.
Figure 41:
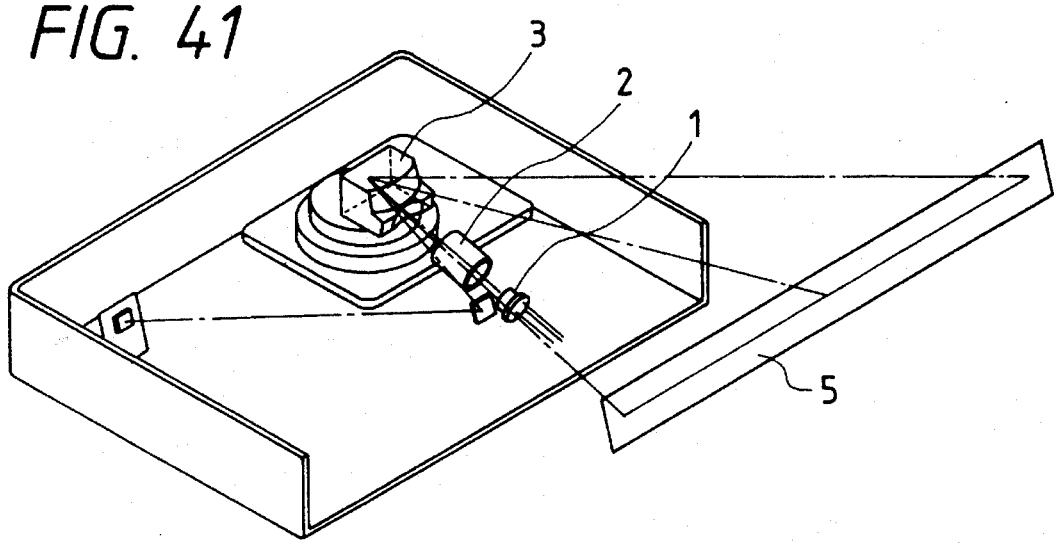
FIG. 41 is a perspective view of the same beam scanning apparatus.

FIG. 40 shows a cross section of the beam scanning apparatus of Example 16 as it is taken in the sub-scanning direction. FIG. 41 is a perspective view of the same scanning apparatus. In this example, the angle formed between the optical axes of the entrance face $S_1$ and exit face $S_3$ of the lens mirror 3 is zero through the cross section taken in the main scanning direction (i.e., the angle $\beta$ shown in FIG. 6 is zero) where as it takes on some positive value through the cross section taken in the sub-scanning direction. A light beam issuing from the semiconductor laser 1 is launched into the lens mirror 3 through the cross section in the main scanning direction as it is directed from the scan center of the scanning plane towards the rotating center of the lens mirror 3; the incident beam is reflected for deflection at a certain positive angle in the sub-scanning direction. The reflecting face $S_2$ of the lens mirrors 3 is spherical. The light beam to be launched into the lens mirror 3 has been collimated by the collimator lens 2.

As in Example 16, the angle formed between the optical axes of the entrance face $S_1$ and exit face $S_3$ of the lens mirror 3 may be adjusted to assume a certain positive value through the cross section taken in the sub-scanning direction while the angle is reduced to zero in the cross section taken in the main scanning direction.

As already mentioned in connection with Example 7, rendering the reflecting face $S_2$ of the lens mirror 3 spherical offers the advantage of providing a higher degree of freedom in optical design and making it possible to correct the astigmatism that may occur in the semiconductor laser 1 serving as the light source. On the other hand, however, the optical characteristics of the apparatus will become asymmetric with respect to the scan center and, hence, various aberrations cannot completely be corrected by means of axially symmetric optics alone that are represented by the spherical lens. However, if, as in Example 16, the angle formed between the optical axes of the entrance face $S_1$ and exit face $S_3$ of the lens mirror 3 is adjusted to zero in the cross section taken in the main scanning direction so that the incident light beam will be launched into the lens mirror 3 through the cross section in the main scanning direction as it is directed from the scan center of the scanning plane towards the rotating center of the lens mirror 3, the optical characteristics of the apparatus will be symmetric with respect to the scan center even if the reflecting face $S_2$ is spherical; hence, it becomes possible to correct various aberrations by using only axially symmetric optics.

If, as in Example 1, the plane formed by the optical axes of the entrance face $S_1$ and exit face $S_3$ of the lens mirror 3 coincides with the plane of deflection which is formed by the deflected light beam, the aperture diameter of the entrance face $S_1$ is limited by its position relative to the exit face $S_3$; furthermore, as already explained with reference to FIG. 27(a), the angle through which the lens mirror 3 is rotated in association with the scan region is limited by the aperture diameter of the entrance face $S_1$. However, in Example 16, the entrance face $S_1$ and the exit face $S_3$ extend in different planes, one being directed upward and the other downward, as shown in FIG. 41; therefore, there is no limitation by the aperture diameter of the entrance face $S_1$.

Another feature of the apparatus of Example 16 is that the optics comprising the semiconductor laser 1, collimator lens 2 and the lens mirror 3 can be brought close to the region wherein the light beam deflected by the lens mirror 3 will pass, thus contributing compactness to the overall size of the apparatus. The optical specifications of a representative design for Example 16 are shown below:

| | $2\omega = 34.0°$ | | |
|---|---|---|---|
| Surface | Radius of curvature | Distance between faces | Refractive index |
| $S_1$ | $r_1 = -5.853$ | $d_1 = 15.000$ | $n_1 = 1.48261$ |
| $S_2$ | $r_2 = 176162.811$ | $d_2 = 15.000$ | $n_2 = 1.48261$ |
| $S_3$ | $r_3 = -13.964$ | $d_3 = 235.000$ | |

The first and third faces are aspheric having the following aspheric coefficients:

$K_1 = -0.50391$
$A_1 = 5.97781 \times 10^{-5}$
$B_1 = -1.54233 \times 10^{-6}$
$K_3 = -0.55676$
$A_3 = -1.08363 \times 10^{-6}$
$B_3 = 0$ It should also be noted that the optical axes of the entrance face $S_1$ and exit face $S_3$ of the lens mirror 3 form an angle of 30° through the cross taken as taken in the sub-scanning direction.

Figure 42A:
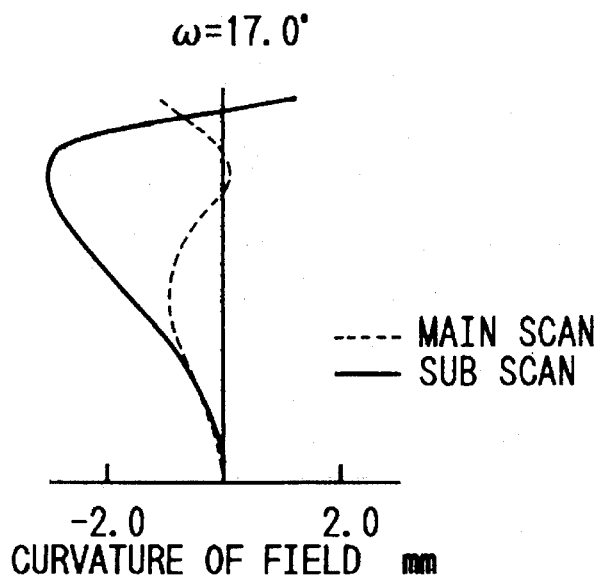
FIGS. 42(a) and 42(b) are graphs plotting the aberrations that occur in the optics shown in FIG. 40.
Figure 42B:
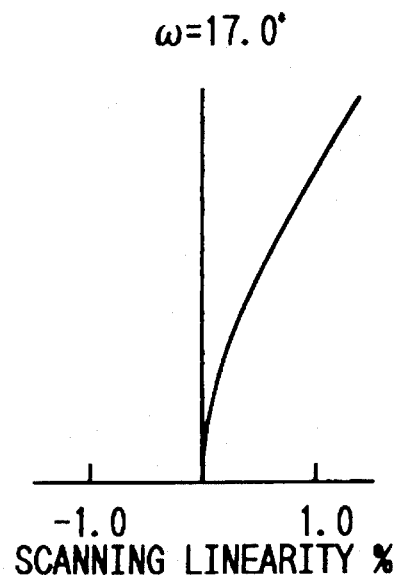

FIGS. 42(a) and 42(b) are graphs plotting the aberrations that occur in the design of Example 16.

EXAMPLE 17

Figure 43:
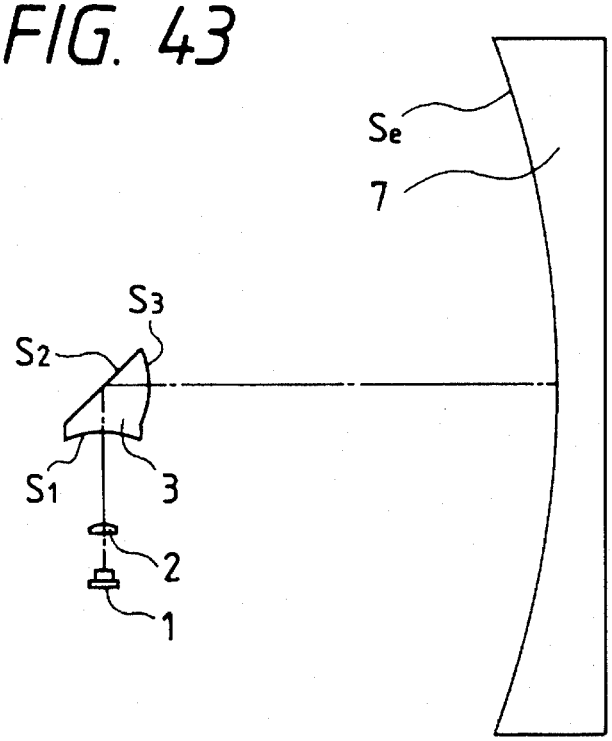
FIG. 43 shows the optics in the beam scanning apparatus of Example 17.
Figure 44:
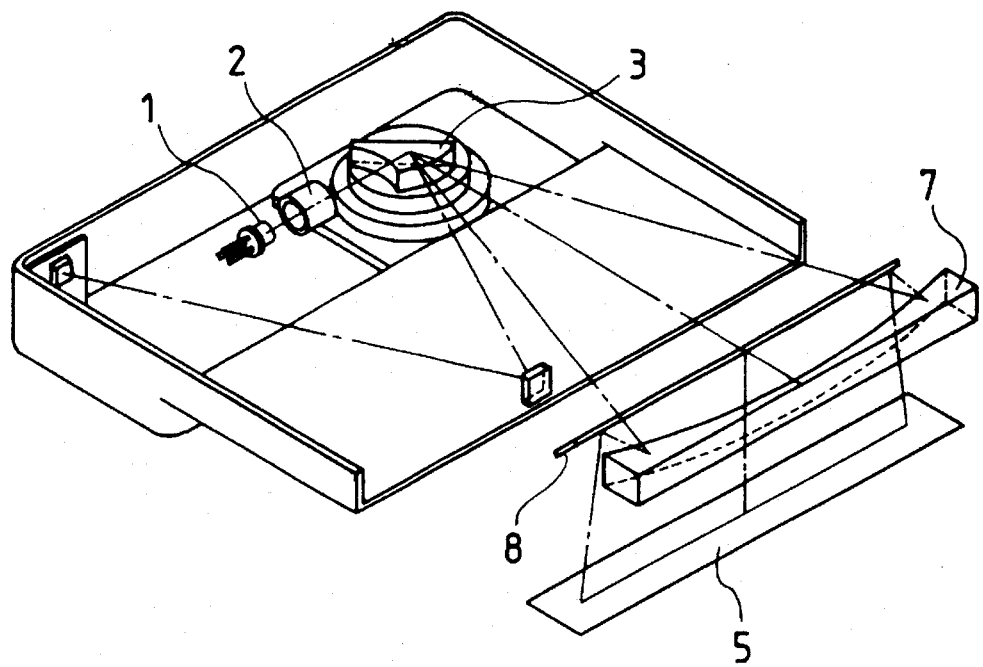
FIG. 44 is a perspective view of the same beam scanning apparatus.

FIG. 43 shows a cross section of the beam scanning apparatus of Example 17 as it is taken in the main scanning direction. FIG. 44 is a perspective view of the same apparatus. The apparatus of Example 17 is so designed that a light beam issuing from the lens mirror 3 is reflected by the reflecting face Se of a bending mirror 7 so that it is focused on the scanning plane. The bending mirror 7 has a concave surface and is positioned in such a way that a light beam passing through the scan center is bent back by 180°. A light beam collimated by the collimator lens 2 is launched into the lens mirror 3.

As in Example 17, not only lenses but also a spherical mirror may be employed to correct aberrations. Beam scanning apparatus, particularly one that is used with a laser printer, often use a bending mirror for changing the direction of a travelling light beam; if the bending mirror is adapted to have a spherical surface so that it is provided with a power, the various aberrations that will develop in the apparatus can be reduced without increasing the number of components to be used. In the case of Example 17, the light beam on the optical axis is bent back by 180°, so in order to direct the light beam toward the scanning plane, one may employed a half mirror 8 or the like. Alternatively, the bending mirror may be inclined in the sub-scanning direction so as to direct the beam of reflected light towards the scanning plane. The optical specifications of a representative design for Example 17 are shown below:

| Surface | Radius of curvature | Distance between faces | Refractive index |
|---|---|---|---|
| | $2\omega = 45.4°$ | | |
| $S_1$ | $r_1 = -46.185$ | $d_1 = 10.000$ | $n_1 = 1.51118$ |
| $S_2$ | $r_2 = \infty$ | $d_2 = 10.000$ | $n_2 = 1.51118$ |
| $S_3$ | $r_3 = -36.642$ | $d_3 = 110.000$ | |
| $S_e$ | $r_e = -358.056$ | $d_e = 73.088$ | |

Figure 45A:
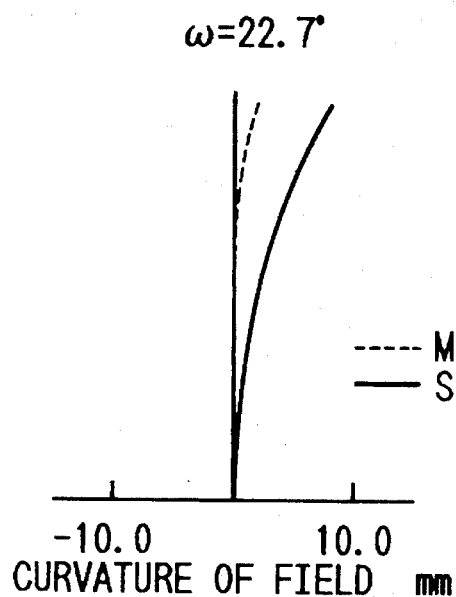
FIGS. 45(a) and 45(b) are graphs plotting the aberrations that occur in the optics shown in FIG. 43.
Figure 45B:
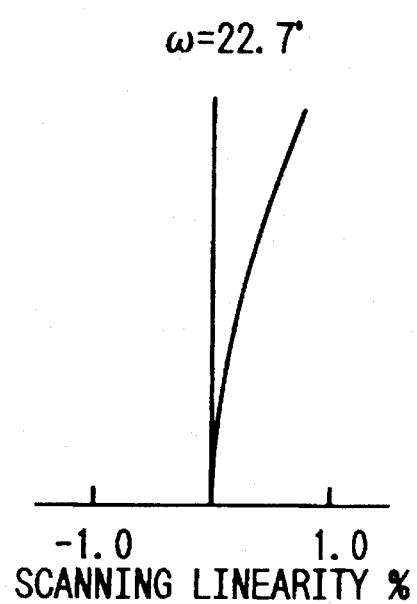

FIGS. 45(a) and 45(b) are graphs plotting the aberrations that occur in the design of Example 17.

All of the above-described examples refer to the case where the lens mirror 3 rotates at uniform speed. It should, however, be noted that those examples can easily be implemented for the case where the lens mirror makes sinusoidal vibrations around the rotating shaft. The specific designs of those examples are intended for operation at specified wavelengths; it should, however, be noted that with slight modifications, equally good results can be attained for light beams within ir, uv, X-ray and other wavelength regions including the visible range.

As described on the foregoing pages, the beam scanning apparatus of the present invention is characterized in that a single optical element is provided with not only a reflecting face but also an entrance face and an exit face that are specified for shape in such a way as to effect predetermined correction of aberrations. As a result, it becomes possible to deflect a light beam for scanning purposes by the optical element per se, thus permitting a substantial reduction in the number of expensive optical parts to be employed. Furthermore, even in the case of using an imaging lens as an auxiliary component, a lens of a smaller aperture can be used with the conventional beam scanning apparatus while, at the same time, it becomes possible to use inexpensive optical materials of low refractive index. Hence, beam scanning apparatus of the type contemplated by the invention which are to be applied to image forming systems such as laser printer, digital copier, facsimile and laser scanning display, or an image input device such as scanner, or optical mark reading laser scanner or surface detecting laser scanner can be provided in small size and at low cost.

In addition, when assembling or adjusting the optics in those systems, the smallness of the number of parts reduces the required volume of work, thereby contributing to a marked improvement in the operational efficiency.

We claim:

1. A beam scanning apparatus for scanning an object, comprising:

a beam generator:

a single, rotatably supported, optical element having a reflecting surface, an entrance face and an exit face, at least one of said entrance face and said exit face having a predetermined shape for correcting aberrations in a light beam projected from said beam generator to said optical element, the light beam being introduced into said optical element through said entrance face, reflected by said reflecting face, and exiting through said exit face to the object to be scanned by said scanning apparatus; and rotational drive means for driving said optical element in a scanning direction about an axis of rotation substantially orthogonal to a plane defined by the path of the light beam through said optical element.

2. A beam scanning apparatus according to claim 1 wherein said entrance face is concave and said exit face is convex.

3. A beam scanning apparatus according to claim 1 wherein said entrance face is convex and said exit face is concave.

4. A beam scanning apparatus according to claim 1 wherein at least one of said entrance face and said exit face are planar.

5. A beam scanning apparatus according to claim 1 wherein at least one of said entrance face and said exit face are aspheric.

6. A beam scanning apparatus according to claim 1 wherein at least one of said entrance face and said exit face are toric.

7. A beam scanning apparatus according to claim 1 wherein radii of curvature of said entrance and exit faces satisfy the following relationship:

$$(R_1-R_2)/D+1/N^2=1$$

where N is the refractive index of said optical element, $R_1$ is the radius of curvature of said entrance face, $R_2$ is the radius of curvature of said exit face, and D is the distance between said entrance face and said exit face along an optical axis of the light beam in said optical element.

8. A beam scanning apparatus according to claim 1 wherein the rotating axis of said optical element is co-planar with said reflecting face.

9. A beam scanning apparatus according to claim 1 wherein the axis of rotation of said optical element lies inside the optical element when viewed in a sub-scanning direction.

10. A beam scanning apparatus according to claim 1 wherein the axis of rotation of said optical element lies outside the optical element when viewed in a sub-scanning direction, and on a side of said reflecting face opposite said entrance face and said exit face.

11. A beam scanning apparatus according to claim 1 wherein the optical axis of said entrance face is disposed at an angle with respect to the optical axis of said exit face when viewed in a cross section taken in a sub-scanning direction.

12. A beam scanning apparatus according to claim 1 wherein said optical element corrects only a curvature of field and astigmatism.

13. A beam scanning apparatus according to claim 1 further comprising imaging optics for focusing the light beam exiting through said exit face on an imaging plane of the object to be scanned.

14. A beam scanning apparatus according to claim 13 wherein said imaging optics comprises a reflecting mirror having a curved reflecting surface.

15. A beam scanning apparatus according to claim 13 wherein said imaging optics comprises a single lens.

16. A beam scanning apparatus according to claim 15 wherein said single lens has a positive refractive power.

17. A beam scanning apparatus for scanning an object, comprising:

a beam generator;

a single, rotatably supported, optical element having a reflecting surface, an entrance face and an exit face, at least one of said entrance face and said exit face having a predetermined shape for correcting aberrations in a light beam projected from said beam generator to said optical element, the light beam being introduced into said optical element through said entrance face, reflected by said reflecting face, and exiting through said exit face to the object to be scanned by said scanning apparatus; and rotational drive means for rotatably driving said optical element in a scanning direction, wherein the optical axis of said entrance face is disposed at an angle with respect to the optical axis of said exit face when viewed in a cross section taken in a sub-scanning direction of the optical element.

\* \* \* \* \*